United States Patent [19]

Witwer et al.

[11] 4,455,743

[45] Jun. 26, 1984

[54] APPARATUS AND METHOD FOR PLACING COILS AND PHASE INSULATION IN THE SLOTS OF A DYNAMOELECTRIC MACHINE STATOR CORE MEMBER

[75] Inventors: Keith A. Witwer, Fort Wayne; Keith W. Moser, Roanoke; Richard A. Sanderson, Fort Wayne, all of Ind.

[73] Assignee: Industra Products, Inc., Fort Wayne, Ind.

[21] Appl. No.: 294,210

[22] Filed: Aug. 17, 1981

[51] Int. Cl.³ .......................................... H02K 15/06
[52] U.S. Cl. .................................... 29/596; 29/564.1; 29/734; 29/736; 310/214; 310/215
[58] Field of Search ............... 29/596, 732, 734, 736, 29/564.1; 310/214, 215

[56] References Cited

U.S. PATENT DOCUMENTS

| | | | |
|---|---|---|---|
| 3,579,818 | 5/1971 | Arnold et al. | 29/596 |
| 3,625,261 | 12/1971 | Hill et al. | 140/92 |
| 3,689,976 | 9/1972 | Donovan | 29/205 |
| 3,698,063 | 10/1972 | Smith | 29/205 |
| 3,722,063 | 3/1973 | Arnold | 29/205 |
| 3,828,830 | 8/1974 | Hill et al. | 140/1 |
| 3,829,953 | 8/1974 | Laver et al. | 29/205 |
| 4,051,595 | 10/1977 | Bale | 29/734 |
| 4,090,290 | 5/1978 | Clark | 29/596 |
| 4,156,964 | 6/1979 | Walker et al. | 29/734 |
| 4,276,689 | 7/1981 | Urick et al. | 29/596 |
| 4,304,045 | 12/1981 | Barrera | 29/736 |
| 4,351,103 | 7/1980 | Rodenbeck | 29/732 |

*Primary Examiner*—Howard N. Goldberg
*Assistant Examiner*—P. W. Echols
*Attorney, Agent, or Firm*—Albert L. Jeffers; Robert G. Irish

[57] ABSTRACT

Apparatus for placing coils and phase insulation in the slots of a dynamoelectric machine stator core member includes a core member loading and unloading station, a coil and phase insulation placing station, a preliminary end turn forming station, and a coil drifting station. An unwound core member at the loading/unloading station is loaded in mounting apparatus on a transfer arm which transfers the core to the placing station where coils and phase insulation are placed in the core member slots. The core is then transferred by the transfer arm to the preliminary end turn forming station where the end turns of the coils are formed away from the bore of the core member. The core member is then transferred by the transfer arm to the drifting station where the coils are drifted into the slots. The transfer arm ultimately transfers a fully wound core back to the loading/unloading station where the wound core is unloaded from the transfer arm and then inverted.

49 Claims, 19 Drawing Figures

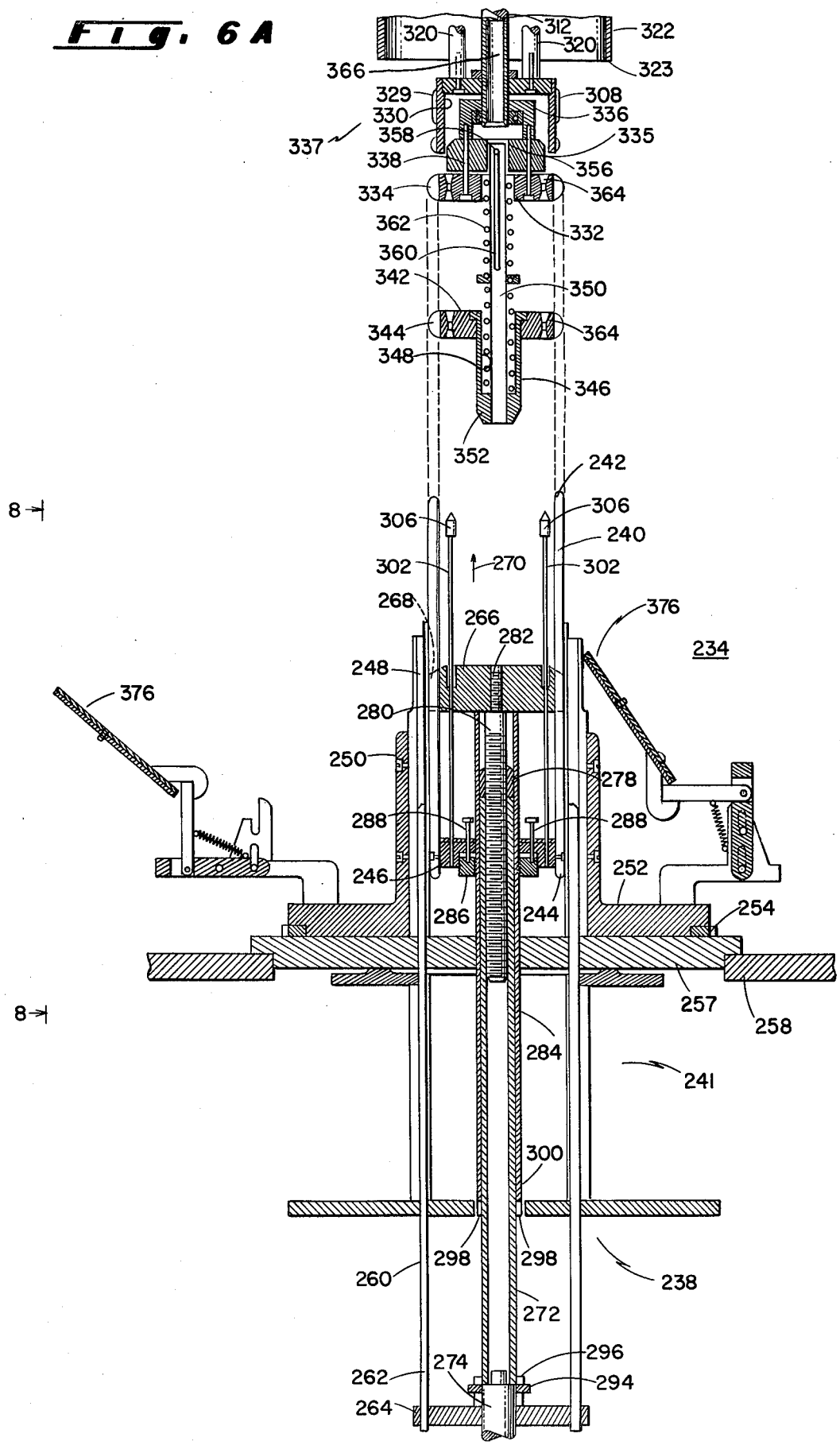

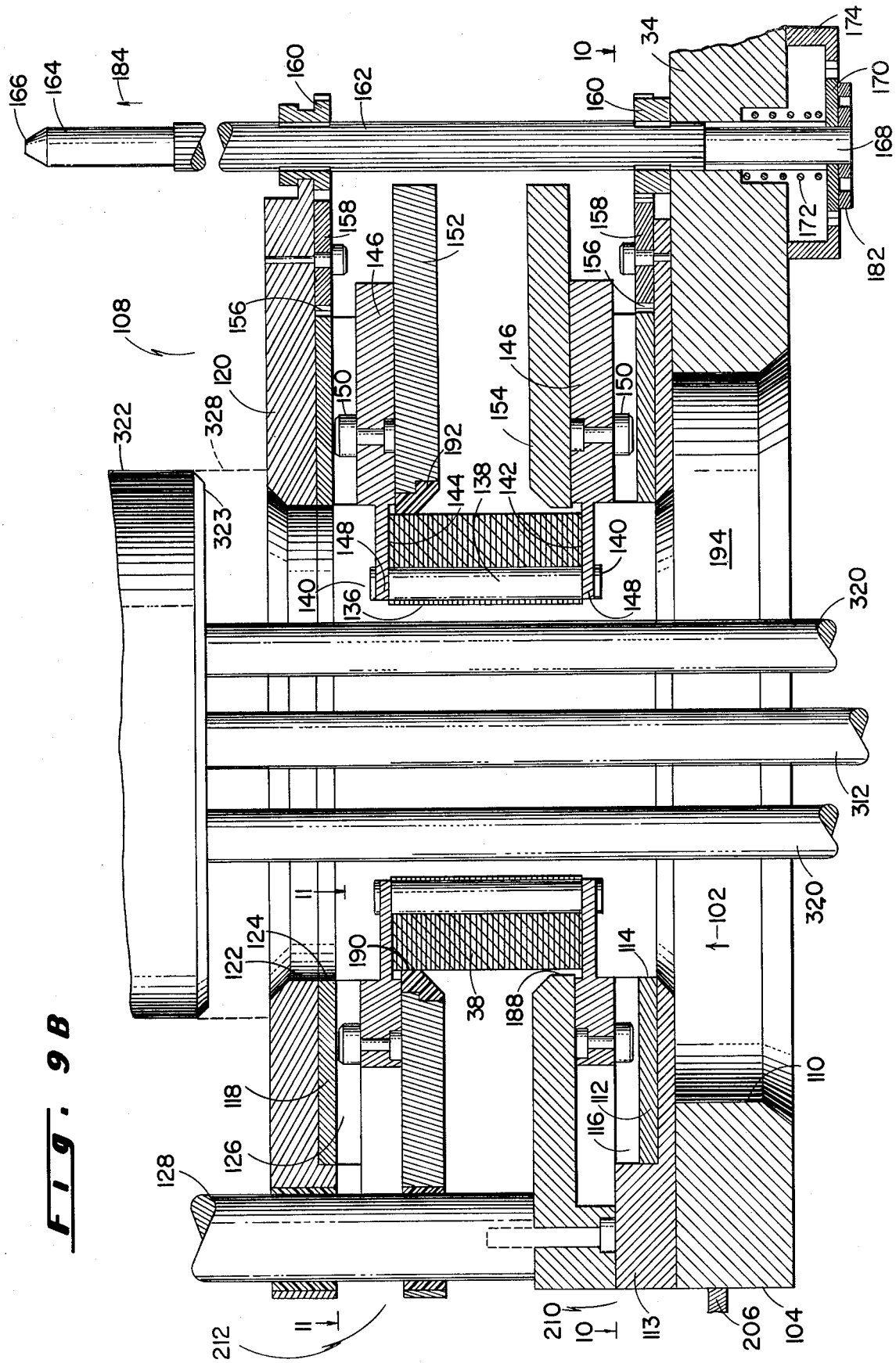

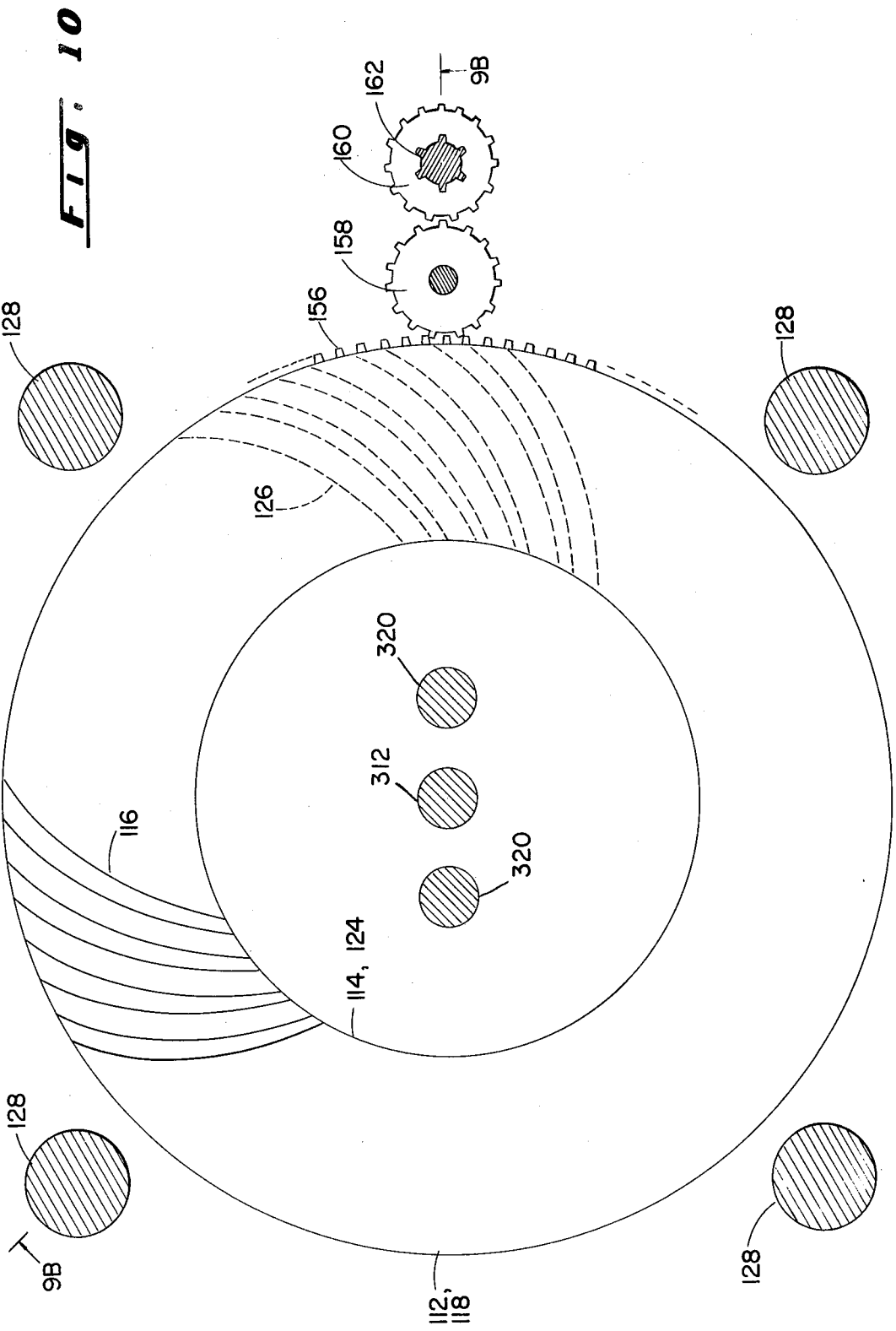

Fig. 13
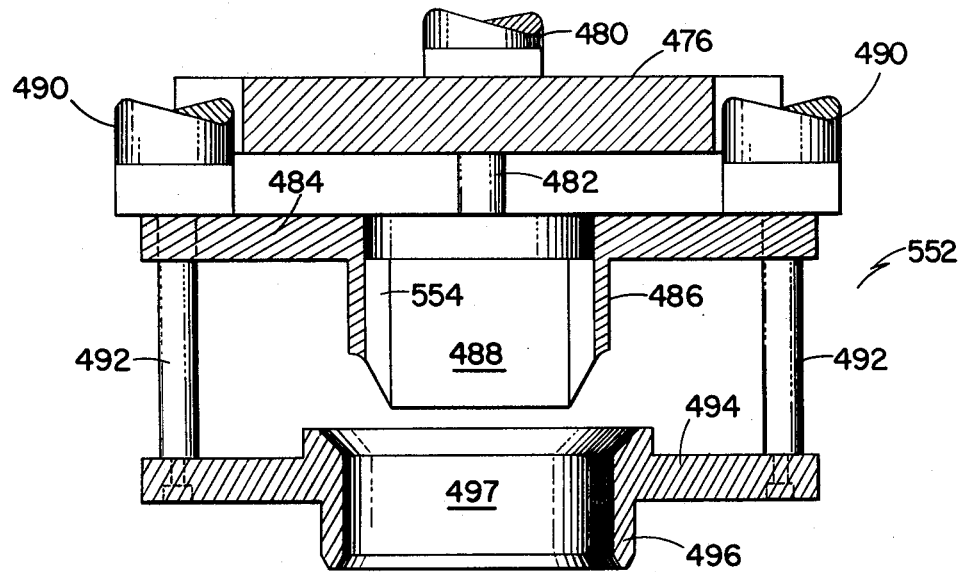
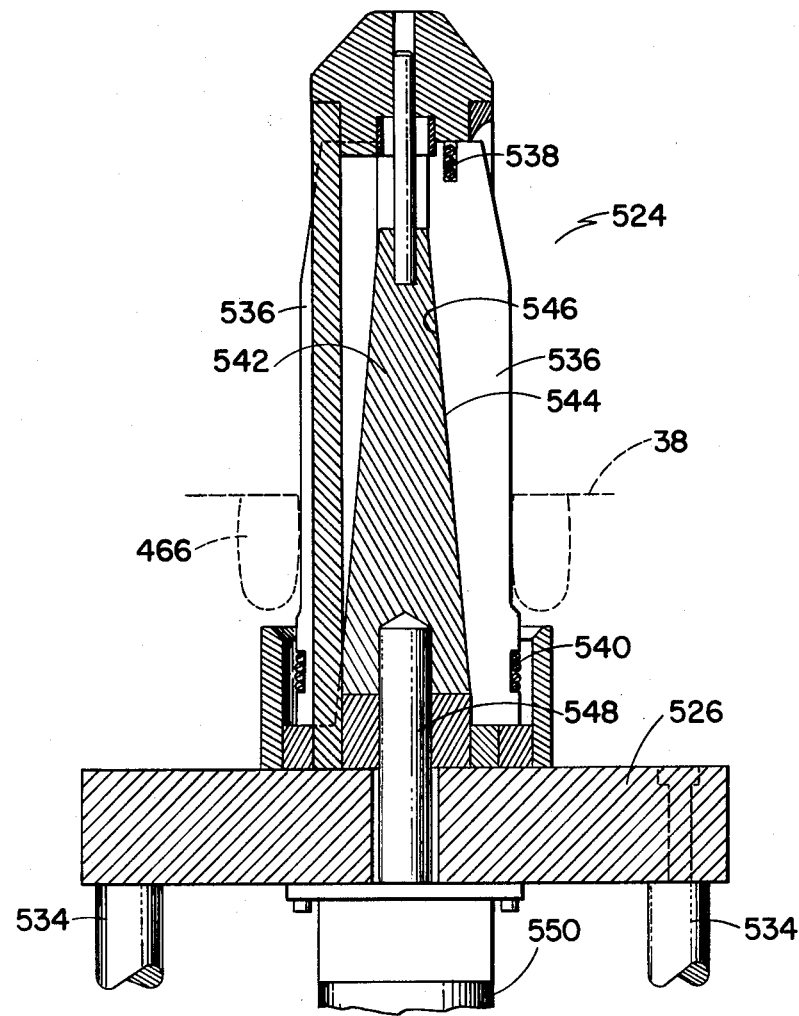

APPARATUS AND METHOD FOR PLACING COILS AND PHASE INSULATION IN THE SLOTS OF A DYNAMOELECTRIC MACHINE STATOR CORE MEMBER

BACKGROUND OF THE INVENTION

1. Field of the Invention

This invention relates generally to apparatuses and methods for placing coils and phase insulation in the slots of a dynamoelectric machine stator core member, and more particularly to multi-station apparatus having core member loading and unloading, coil and phase insulation placing, preliminary end turn forming, and coil drifting stations and in which a fully wound core is inverted upon return to the loading/unloading station, and including an improved mechanism and method at the placing station for placing the phase insulation in the core member slots.

2. Description of the Prior Art

A stator for an alternating current dynamoelectric machine, such as a three-phase induction motor, conventionally comprises a laminated, internally slotted core member having insulative liners or cells in the slots, each slot liner having cuff portions extending from opposite sides of the core. Concentric coils forming the poles for each phase of the winding are arranged in successive, mechanically displaced layers in the slots with phase insulator elements interposed between the coil sides of different phases occupying the same slots.

The concentric coils forming the poles of each phase are commonly placed in the core member slots by the use of placing apparatus of the type shown, for example, in U.S. Pat. No. 3,324,536, assigned to the assignee of the present application, which comprises a cylindrical array of elongated blade elements adapted to extend through the bore of the core member and respectively to engage the inner ends of the teeth which define the slots therebetween. Prewound coils are placed on the blade elements, prior to placing the core member thereon, such as by the use of a transfer tool as shown in U.S. Pat. No. 3,686,735, also assigned to the assignee of the present application. After positioning of the core member on the blade elements, the coils thereon are pushed through the bore by a stripper member, the coil sides thus entering respective slots, all as more fully described in the aforesaid U.S. Pat. No. 3,324,536.

It is known in such coil placing apparatus to place phase insulators on the blade elements over the prewound coils thereon, the phase insulators then being pushed through the bore so that their leg portions enter the slots over the coils of another phase previously placed therein.

Following the placing of the coil forming each phase in the slots, the end turns of the coils at each end of the core member are conventionally formed outwardly away from the bore, and the coil sides in the slots are drifted or compacted in order to permit placing of the coils forming other phases therein.

In the use of prior coil placing apparatus of the type illustrated and described in the aforesaid U.S. Pat. No. 3,324,536, it is known to hand-place a stator gauge tool and blade alignment tool over the elongated blade elements prior to positioning the core member thereon which assist in providing correct core-to-placer blade registration and detect loose, bent or misaligned core laminations. Such prior hand-placed tools are pushed through and out of the core member bore by the end turns of the coils as they are pushed through the bore by the stripper member.

It is also known in the forming of the end turns away from the bore to employ a "bullet" tool which extends through and clears the bore of a wound core member, an operator manually placing each end of the core on the tool in order to form the end turns. It is also known to employ a drift tool which enters the bore of a wound core member and has expansible fin elements which enter the slots thereby to compact the coil sides therein.

SUMMARY OF THE INVENTION

The invention, in its broader aspects, provides apparatus for placing coils and phase insulation in the slots of a dynamoelectric machine stator core member. The apparatus comprises a first core loading and unloading station, a second coil and phase insulation placing station, a third preliminary coil end turn forming station, and a fourth coil drifting station. Means are provided for transferring a core successively from the first station to the second, third and fourth stations and then back to the loading and unloading station, and means are provided at the loading and unloading station for inverting a wound core member.

In the preferred embodiment of the invention, mechanism is provided at the placing station which comprises a cylindrical array of elongated, circumferentially spaced blade elements adapted to extend through the bore of a stator core member and respectively to engage the inner ends of the teeth thereof which define the winding slots therebetween, the spaces between the blade elements respectfully communicating with the slots. The blade elements respectively have distal ends and proximal ends with means being provided for mounting the blade elements adjacent their proximal ends. A stripper member is provided axially movable within the array between retracted and extended positions and having portions which extend into the spaces between the blade elements. At least two of the blade elements are adapted to have a coil placed thereover from the distal ends with one end portion of the coil within the array between the stripper member and the distal ends, with the side portions of the coil respectively extending through two spaces respectively on either side of the two blade elements, and with the other end portion of the coil being disposed on the exterior of the array. First means is provided for moving the stripper member toward its extended position thereby to engage the one end portion of the coil and to push the same through the core member bore so that the coil side portions enter a respective two of the core member slots.

In accordance with the invention, a phase insulation insertion member is provided axially movable from a first position axially aligned with and spaced from the distal ends of the blade elements, and a second position within the array between the one end portion of the coil on the two blade elements and the distal ends thereof, the insertion member having portions which extend into the spaces between the blade elements in its second position. Second means is provided for moving the insertion member between its positions independently of the stripper member whereby a phase insulation element having opposite end portions joined by two spaced, parallel leg portions may have one end portion thereof placed over the distal ends of the two blade elements when the insertion member is in its second position, the leg portions of the insulation element extending through the two spaces and the other end portion being disposed on the exterior of the array, so that movement of the insertion member toward its first position prior to movement of the stripper member toward its extended position pulls the phase insulation element through the core member bore with the leg portions entering the two core member slots which communicate with the two spaces over the sides of previously placed coils therein.

In the preferred embodiment, a shield member is provided movable between a first position overlaying the side portions and other end portion of the coil on the two blade elements, and a second position spaced radially outwardly from the array, the other end portion of the phase insulation element in the second position of the insertion member being supported on the shield member in its first position thereby protecting the phase insulation element while it is being pushed into the core member bore. In the preferred embodiment, the insertion member has a portion thereon remote from the one end portion of the coil on the two blade elements which defines an annular space for receiving the one end portion of the phase insulation element thereby further protecting the phase insulation element while it is pushed through the bore.

In the preferred embodiment, the blade mounting means with the blade elements mounted thereon is axially movable from a normal to an extended position, and means is provided for providing a lost-motion connection between the stripper member and the blade mounting means so that after a predetermined movement of the stripper member away from its retracted position toward its extended position, the blade mounting means and the blade elements are moved axially from the normal to the extended position thereof in unison with the stripper member.

It is accordingly an object of the invention to provide improved apparatus for placing coils and phase insulation in the slots of a dynamoelectric machine stator core member.

Another object of the invention is to provide an improved method of placing coils and phase insulation in the slots of a dynamoelectric machine stator core member.

A further object of the invention is to provide improved apparatus for placing coils and phase insulation in the slots of a dynamoelectric machine stator core member in which the phase insulation is placed in the slots of the core member over previously placed coils therein prior to placing other coils thereover.

Yet another object of the invention is to provide an improved apparatus for placing coils and phase insulation in the slots of a dynamoelectric machine stator core member wherein the phase insulation is protected during placing in the core member slots.

A still further object of the invention is to provide an improved apparatus for placing coils and phase insulation in the slots of a dynamoelectric machine stator core member wherein the resultant fully wound core member is inverted.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIGS. 6A and 6B are fragmentary side cross-sectional views taken generally along the line 6—6 of FIG. 1;

FIGS. 9A and 9B are enlarged cross-sectional views of the placing apparatus;

FIG. 10 is a fragmentary cross-sectional view taken generally along the line 10—10 of FIG. 9B;

FIG. 13 is a fragmentary cross-sectional view taken generally along the line 13—13 of FIG. 1;

DESCRIPTION OF THE PREFERRED EMBODIMENT

Figure 1:
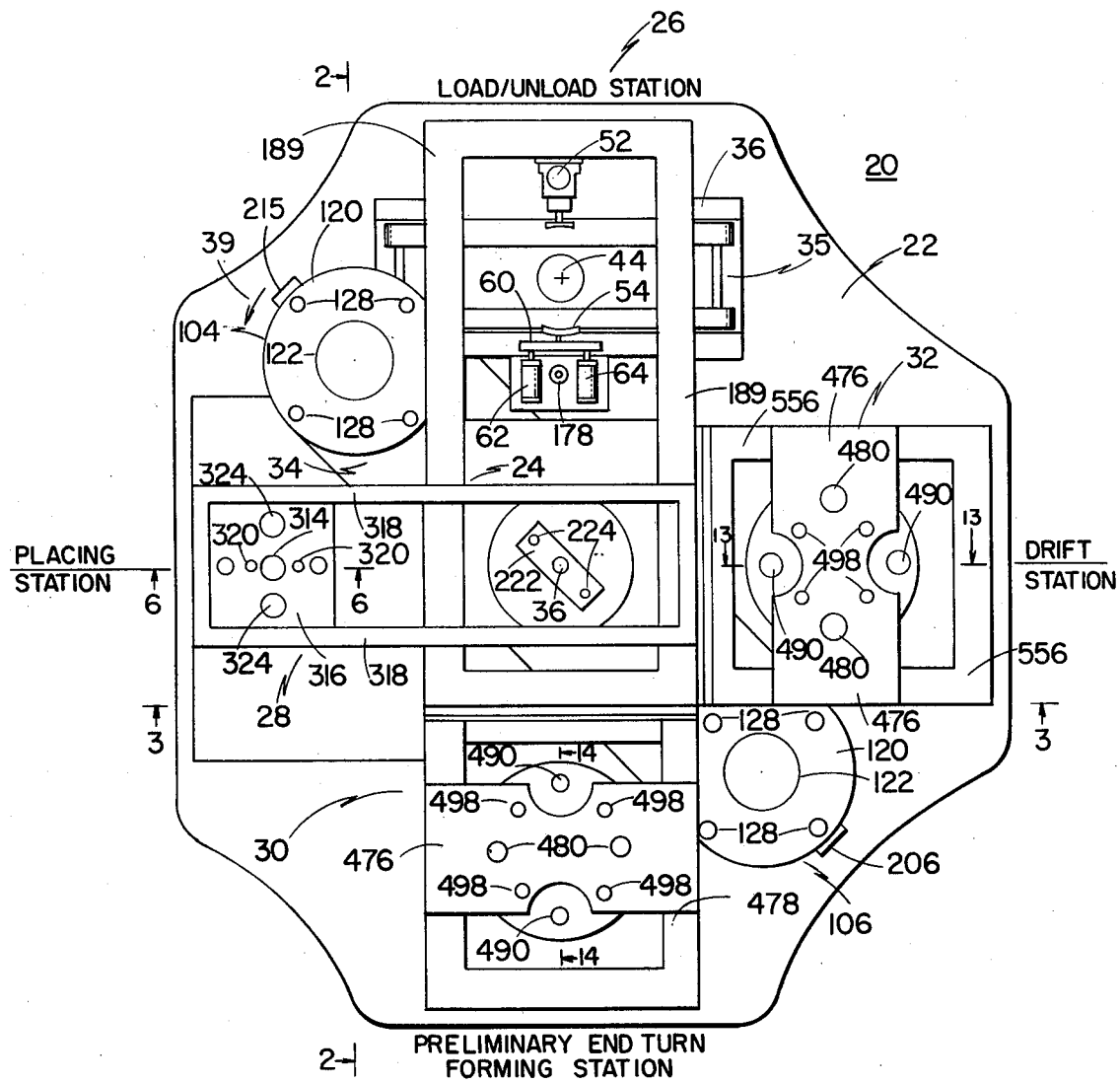
FIG. 1 is a top view showing the improved apparatus of the invention.
Figure 2:
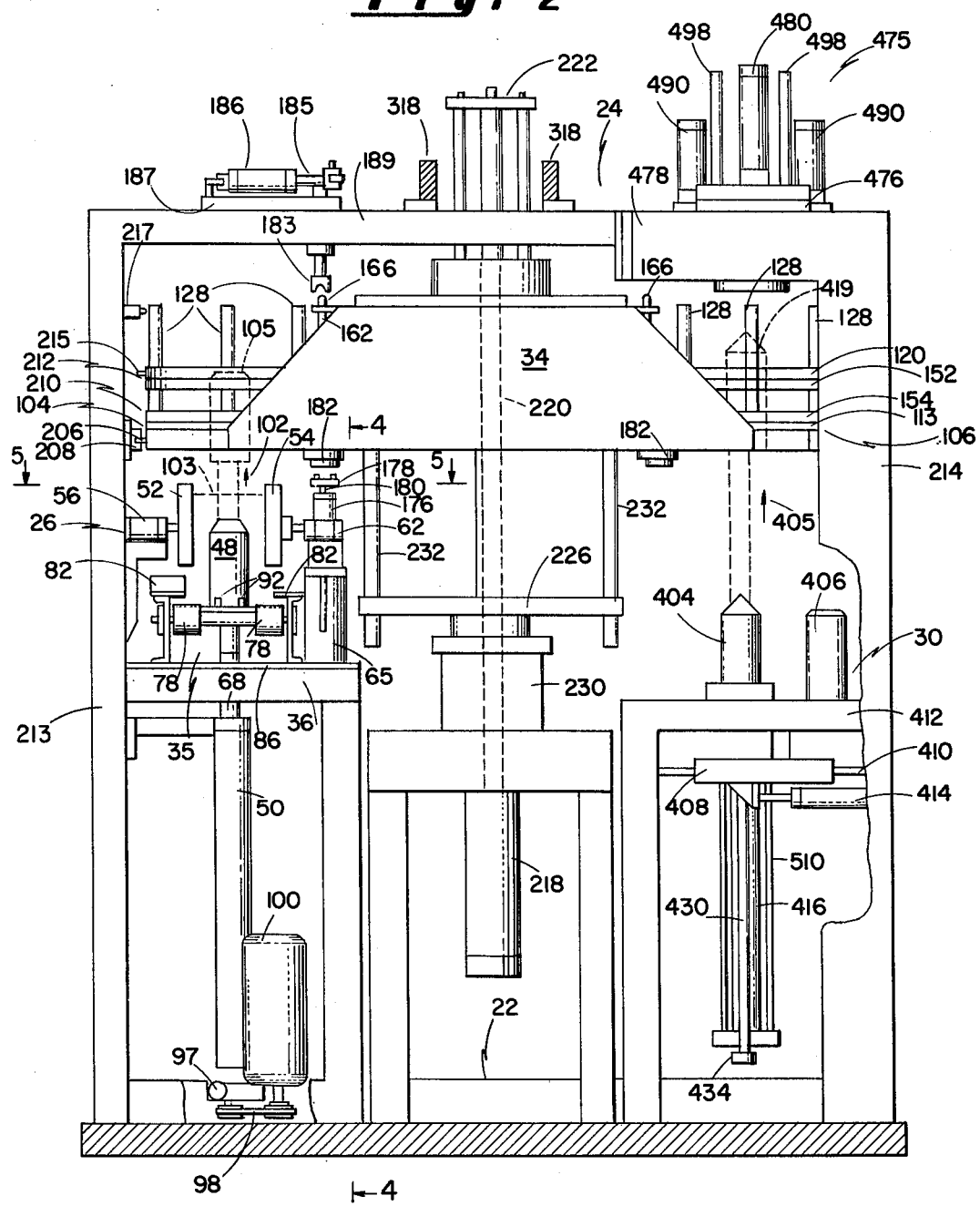
FIG. 2 is a side view, partly in section, taken generally along a line 2—2 of FIG. 1.
Figure 3:
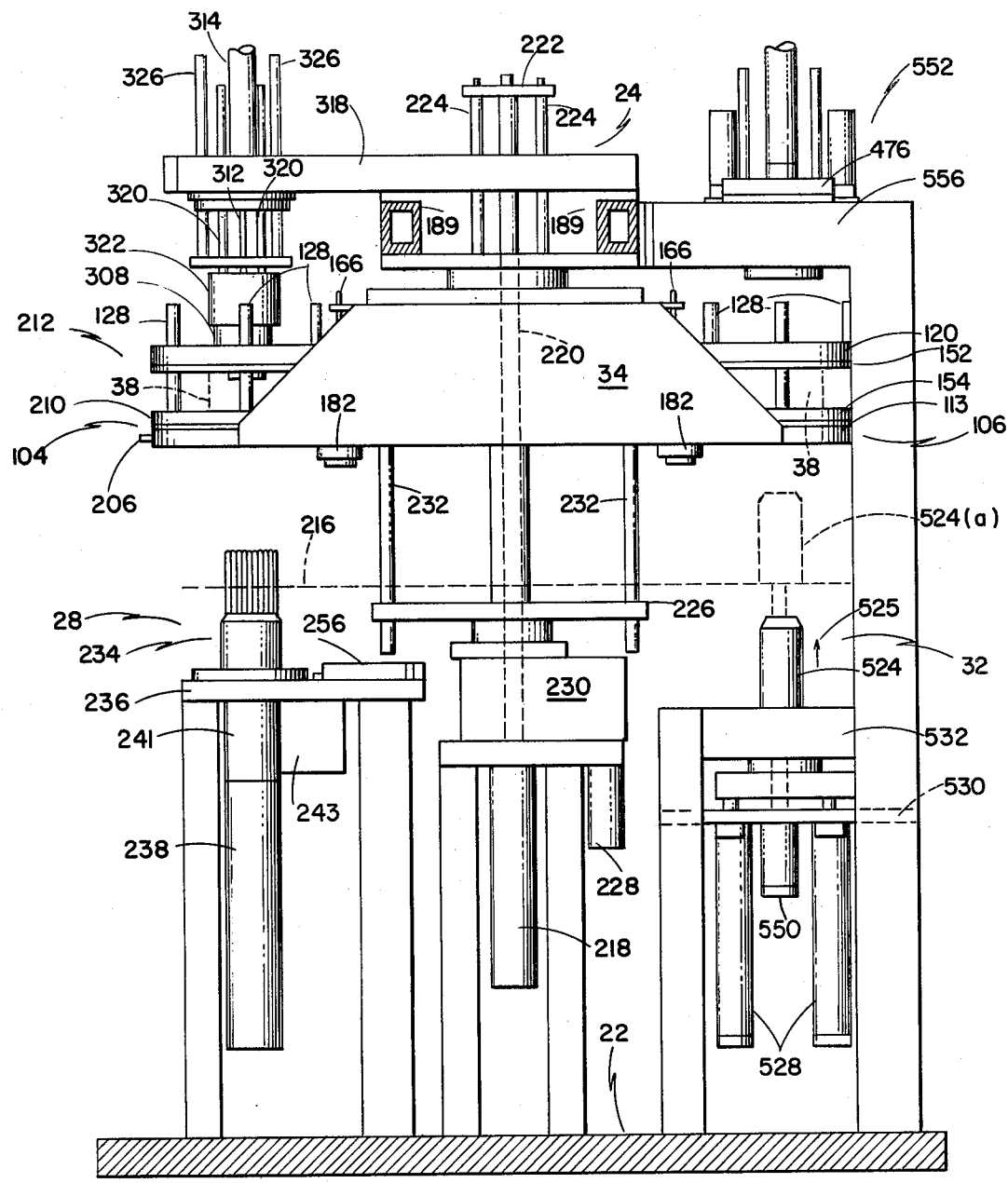
FIG. 3 is a side view, partly in section, taken generally along the line 3—3 of FIG. 1.

Referring now to FIGS. 1, 2 and 3 of the drawing, the improved apparatus of the invention for placing coils and phase insulation in the slots of a dynamoelectric machine stator core member, generally indicated at 20, includes a frame having lower section 22 and upper section 24. Core loading and unloading station 26, coil and phase insulation placing station 28, preliminary end turn forming station 30, and coil drifting station 32 are located on lower frame section 22 in 90° spaced relationship, as shown. Transfer member 34 rotatably mounted on lower frame section 22, as at 36, between upper and lower frame sections 24,22 is rotated or indexed in the direction shown by arrow 39 so as to move a core member successively from loading and unloading station 26 to coil and phase insulation placing station 28, preliminary end turn forming station 30, drifting station 32, and back to core loading and unloading station 26.

Figure 4:
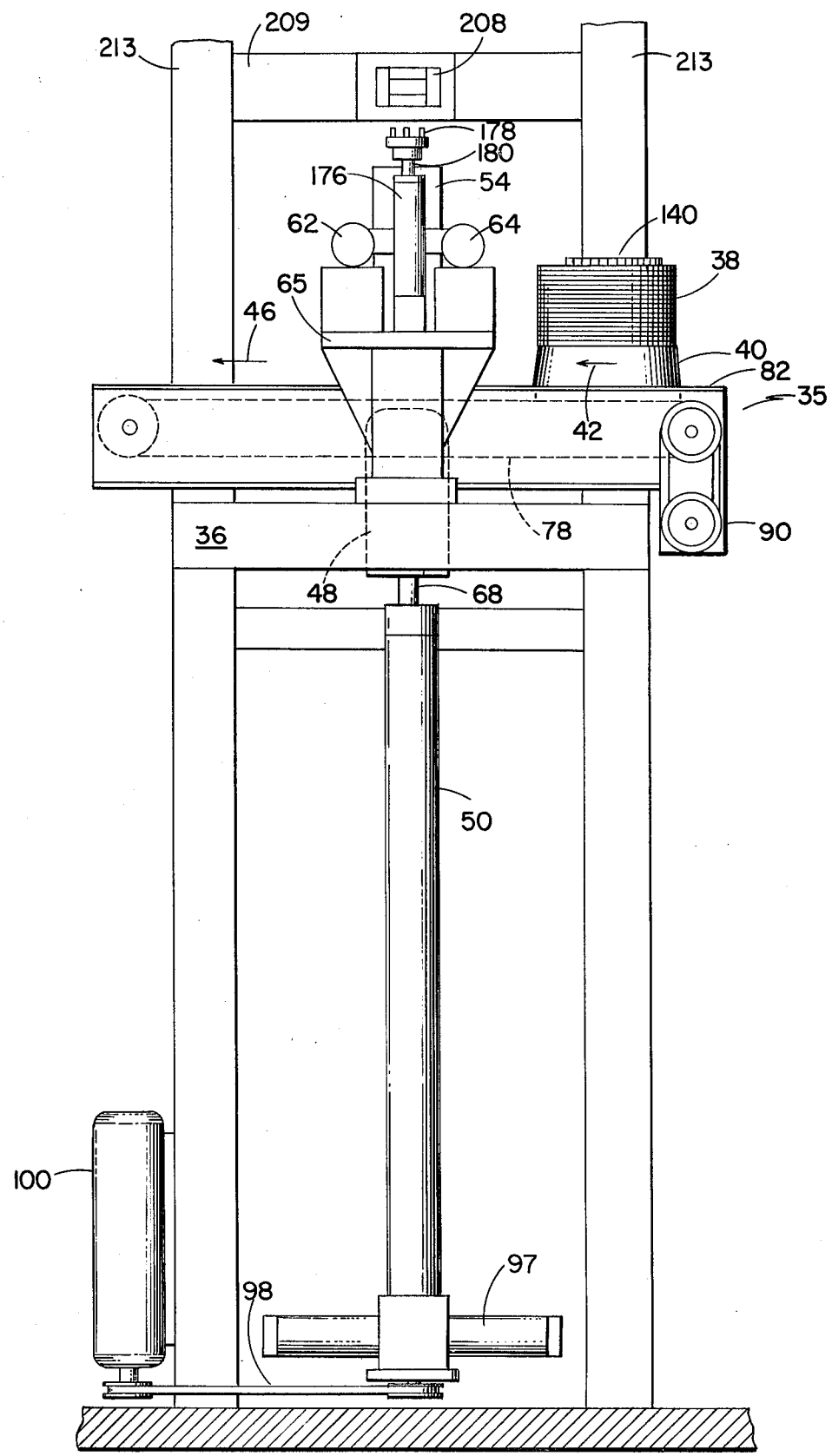
FIG. 4 is a fragmentary side view, taken generally along the line 4—4 of FIG. 2.
Figure 5:
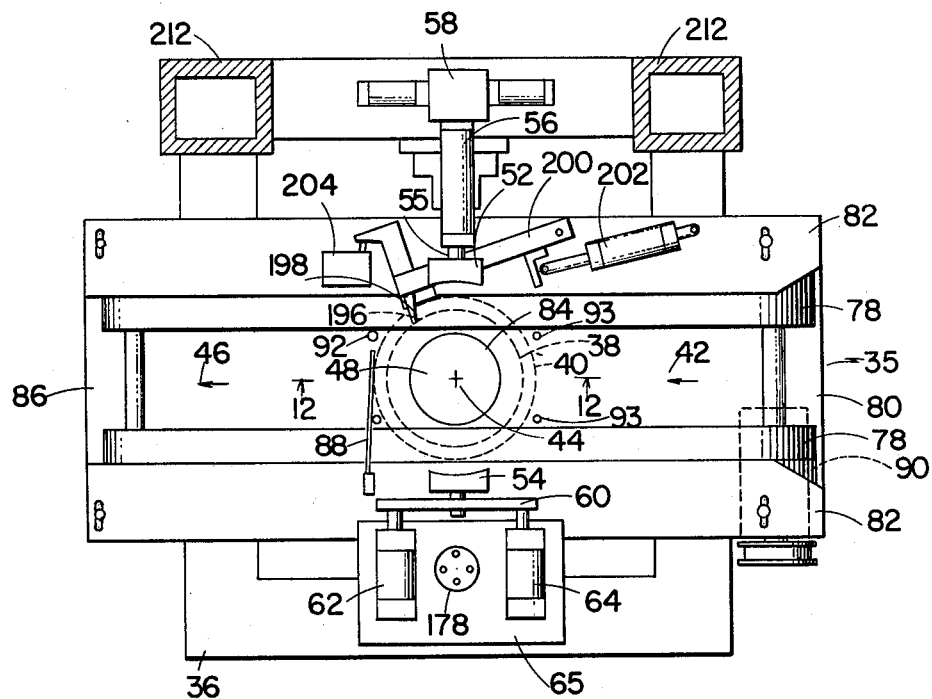
FIG. 5 is a fragmentary top view, partly in section, taken generally along the line 5—5 of FIG. 2.

Referring now additionally to FIGS. 4 and 5, core loading and unloading station 26 comprises conventional conveyor 35 supported on platform 36 which forms a part of lower frame section 22. Conveyor 35 transports unwound stator core members 38 respectively supported on trays 40 in the direction shown by arrow 42 to a position concentric with loading and unloading axis 44 (FIG. 5), and transports fully wound stator core members away from loading and unloading axis 44 in the direction shown by arrow 46.

Loading and unloading arbor 48 is provided on axis 44 and is movable by a cylinder 50 from a lower, inactive position, as shown in dashed lines in FIG. 4, through the position shown in solid lines to an upper position as shown in dashed lines in FIG. 2. The coils placed in the slots of stator core member 38 by the placer apparatus at placing station 28 have their leads (not shown) extending downwardly and thus, in order to avoid having the leads damaged when the fully wound core member is returned to a tray 40, clamps 52, 54 are provided for gripping a wound stator core member 38 and inverting the same by 180° so that the coil leads extend upwardly rather than downwardly. Clamp 52 is mounted on piston rod 55 of fluid power cylinder 56 which actuates clamp 52 in to and out of engagement with the periphery of stator core 38. Cylinder 56 is, in turn, mounted on multimotion fluid power actuation 58 which rotates clamp 52 by 180° and then returns clamp 52 to its initial position. Clamp 54 is rotatably mounted on bracket 60 connected to the piston rods of fluid power cylinders 62, 64 which actuate bracket 60 and clamp 54 into and out of engagement with the periphery of stator core member 38 diametrically opposite from clamp 52. Cylinders 62, 64 are mounted on support 65 mounted on platform 36.

Figure 12:
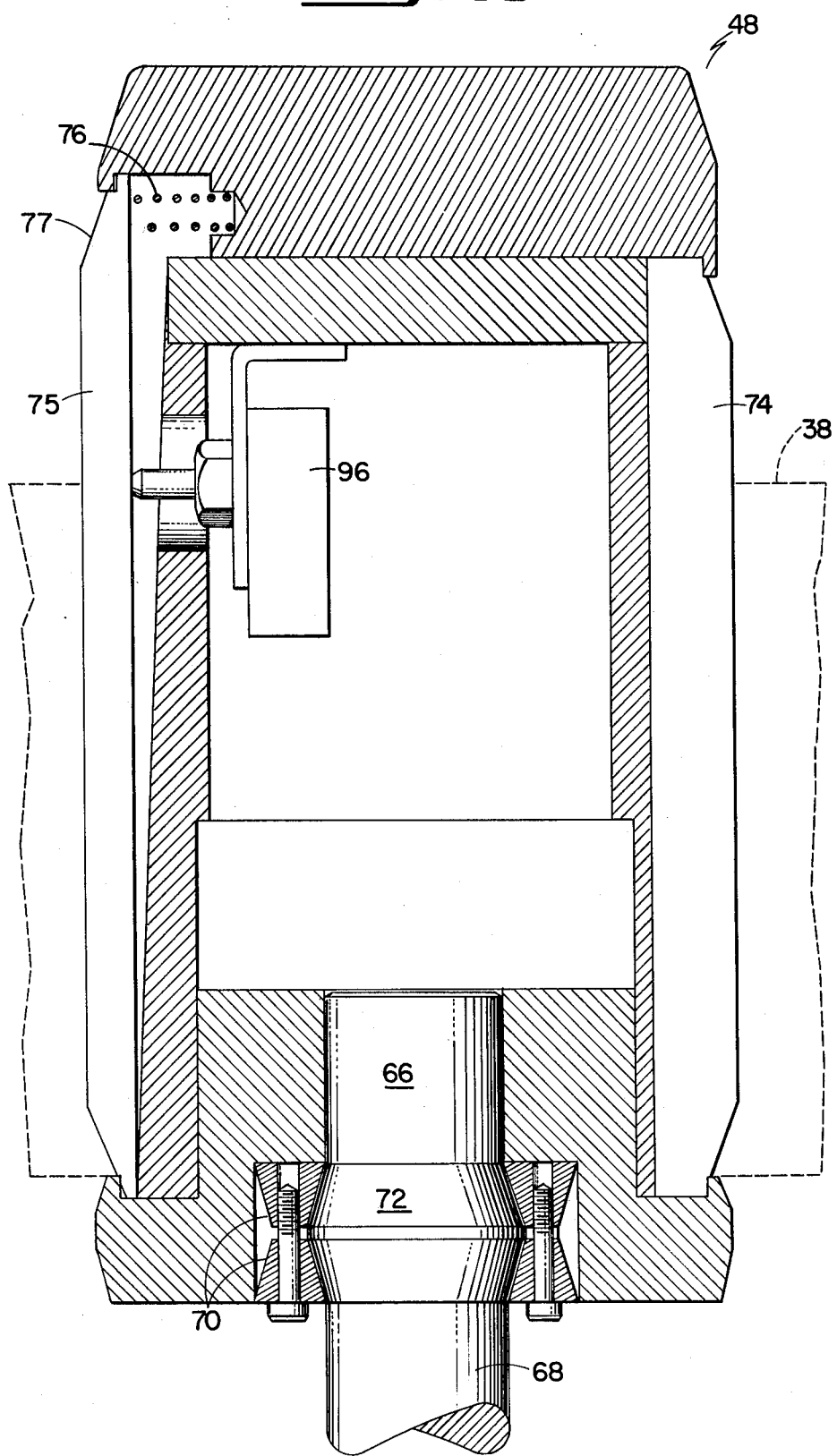
FIG. 12 is a fragmentary cross-sectional view taken generally along the line 12—12 of FIG. 5.

Referring additionally to FIG. 12, arbor 48 is mounted on extension 66 and piston rod 68 of fluid power cylinder 50. Wedge members 70 clamp arbor 48 on enlarged portion 72 of piston rod extension 66 so that arbor 48 rotates with piston rod 68. Arbor 48 is provided with a plurality of circumferentially spaced fin elements 74. One fin element 75 is spring-biased radially outwardly as by spring 76. The operator places a tray 40 with an unwound core member 38 thereon on belts 78 of conveyor 35 at loading end 80. Tray 40 and core member 38 then move in the direction shown by arrow 42, tray 40 being guided by adjustable side guides 82 to the position shown in dashed lines in FIG. 5 where stop pins 92 extended by suitable cylinders (not shown) arrest tray 40 and core member 38 with the bore of stator core member 38 axially aligned with opening 84 in bottom plate 86 of conveyor 35, proper positioning of tray 40 and core member 38 being sensed by feeler switch 88 which deactuates belt drive motor 90. Stop pins 93 are retracted by suitable cylinders (also not shown) while a tray 40 and core member 38 are moved to the loading position.

Cylinder 50 is then actuated to raise loading arbor 48 into the bore of stator core member 38, fins 74 being adapted respectively to enter the slots therein. In the event of misalignment between the slots of stator core member 38 and fins 74 so that fins 74 will not enter the slots, tapered upper end 77 of spring-biased fin 75 will engage a tooth of core member 38 thus depressing fin 75 so as to actuate switch 96. Actuation of switch 96 terminates the upward motion of piston rod 68 of cylinder 50 and actuates rack and pinion fluid power actuator 97 so as to rotate piston rod 68 of cylinder 50 and arbor 48 until fin 75 enters a respective slot in core member 38 causing deactuation of switch 96. Deactuation of switch 96 deactuates drive 97 and actuates cylinder 50 to resume the upward motion of arbor 48 and stator core member 38 in the direction shown by arrow 102 to an indexing position, as shown in dashed lines at 103.

Referring now additionally to FIG. 5, stator core member 38 has suitable indexing notch 196 formed in its periphery. Upon reaching indexing position 103, actuator 97 (FIG. 2) rotates arbor 48 and stator 38 until element 198 on the end of pivoted lever member 200 engages notch 196; lever member 200 is biased toward stator 38 by fluid power cylinder 202. When element 198 engages notch 196, switch 204 is actuated to terminate the indexing motion provided by mechanism 97. Arbor 48 with stator 38 thereon is then again moved upwardly by cylinder 50 to the position shown in dashed lines 105 in FIG. 2.

Referring now to FIGS. 1, 2, 3, 9B, 10 and 11, transfer member 34 has diametrically opposite ends 104, 106. Core mounting assemblies 108 are mounted on transfer member 34 respectively adjacent ends 104, 106 (FIG. 9B). Since core mounting assemblies 108 are identical at each end of transfer member 34, description of one will suffice. Core mounting assembly 108 is concentric with opening 110 in transfer member 34 adjacent the respective end 104, 106. Annular plate member 112 is mounted on support plate 113 on transfer member 34 and has its central opening 114 in axial alignment with opening 110. Annular plate member 112 has upwardly facing helical grooves 116 formed therein. Another annular plate member 118 is mounted on movable upper plate member 120 having central opening 122 coaxial with central opening 124 in annular plate member 118, central opening 114 in annular plate member 112 and opening 110 in transfer member 34. Annular plate member 112 has upwardly facing helical grooves formed therein, as shown in FIG. 10. Annular plate member 118 has downwardly facing helical grooves 126 formed therein which extend oppositely from grooves 116 in annular plate member 112 as shown in dashed lines in FIG. 10. Upper plate member 120 is mounted on guide rods 128 for vertical movement with respect to transfer member 34.

Figure 11:
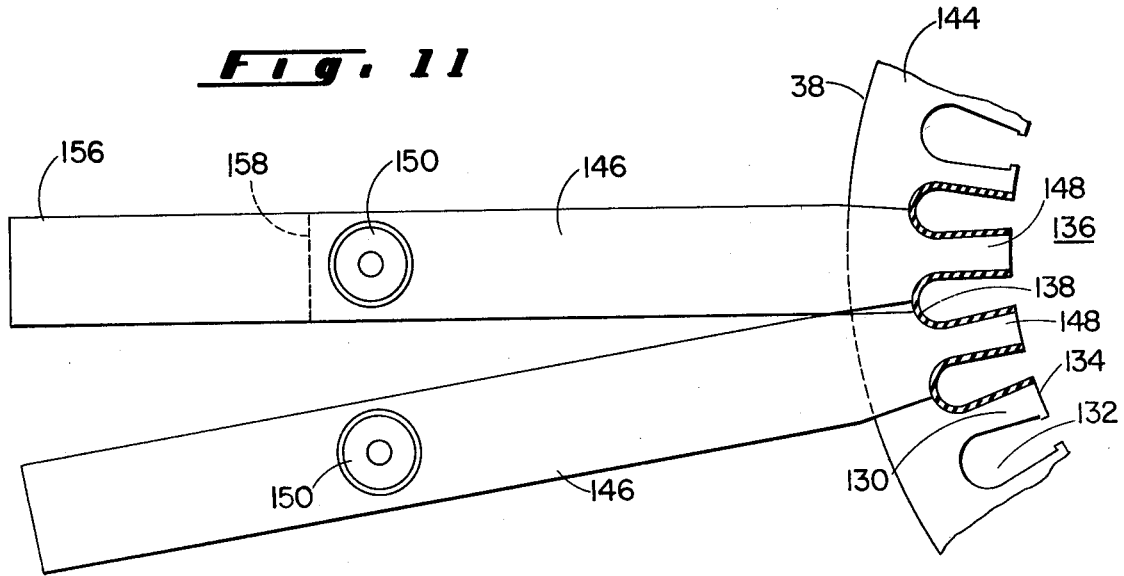
FIG. 11 is a fragmentary cross-sectional view taken generally along line 11—11 of FIG. 9B.

Referring particularly to FIG. 11, core member 38 has radially inwardly extending teeth 130 respectively defining slots 132 therebetween and respectively having inner ends 134 which define bore 136 for receiving a rotor member (not shown). Slot liners 138 formed of relatively thin insulative material are positioned in slots 132 prior to loading of core member 38 on apparatus 20 and respectively have cuff portions 140 extending from opposite sides of 142, 144 of stator core member 38, (FIG. 9B).

A plurality of elongated finger elements 146 is provided respectively having inner end portions 148 which cooperate to engage cuff portions 140 of slot liners 138, as shown in FIG. 9b. Finger elements 146 respectively have cam rollers 150 rotatably mounted thereon. A first plurality of finger elements 146 is supported on lower annular plate member 112 with cam rollers 150 cooperatively seated in helical grooves 116. A second plurality of finger elements 146 is supported on annular plate member 152 with its cam rollers 150 seated in helical grooves 126 of upper annular plate member 118. The lower plurality of finger elements 146 supported on annular plate member 112 is retained by annular plate member 154 (FIG. 9B). The finger elements 146 which extend toward guide posts 128 have their outer ends 156 cut-off as shown in dashed lines at 158 in FIG. 11. Annular plate member 152 is also movably mounted on guide rods 128.

The peripheries of annular plate members 112, 118 have gear teeth 156 formed thereon which mesh with idler gears 158 respectively rotatably mounted on plate members 113, 120. Idler gears 158 respectively mesh with drive gears 160 driven by splined shaft 162 (FIGS. 9B, 10). Upper end 164 of shaft 162 has tongue 166 formed thereon and lower end 168 has gear 170 secured thereto. Shaft 162 is biased downwardly by spring 172 so that gear 170 is normally locked into engagement with mating teeth on bracket 174 secured to transfer member 34 (FIG. 9B).

Referring now particularly to FIGS. 2, 4 and 9B, fluid power cylinder 176 has engaging element 178 on the end of its piston rod 180, which, upon extension of piston rod 180 engages cooperating element 182 on gear 170 thereby to move gear 170 upwardly in the direction shown by arrow 184 out of engagement with locking bracket 174, so as to cause tongue 166 on shaft 162 to move into engagement with cooperating grooved element 183 rotated by linkage 185 actuated by fluid power cylinder 186. Cylinder 186 is mounted in plate member 187 which straddles frame members 189 of upper frame section 24. Actuation of fluid power cylinder 186 with cylinder 176 actuated results in rotation of shaft 162, gears 160, 158 and annular members 112, 118 thereby to move finger elements 146 radially inwardly or outwardly in iris fashion.

It will now be seen that finger elements 146 are normally retracted so as to clear openings 114 in annular plate member 112, 188 in annular plate member 154, 190 in annular plate member 152, 124 in annular plate member 118, and 122 in annular plate member 120 so as to permit core member 38 with slot liners 138 previously positioned in slots 132 to be raised by arbor 48 to the position shown in FIG. 9B. Annular plate member 152 has element 192 secured thereto which defines bore 190 and which provides a tight fit with the periphery of core member 38. Movement of core member 38 on arbor 48 upwardly in the direction as shown by arrow 102 (FIG. 2) causes stator core member 38 to engage element 192 thereby raising annular plate members 152, 118 and 120 along with the upper plurality of finger elements 146 to the position shown in FIG. 9B and in dashed lines at 105 in FIG. 2. When stator core 38 reaches the position shown in FIG. 9B, fluid power cylinder 186 is actuated thereby to extend finger elements 146 to the positions shown in FIG. 9B respectively extending outwardly over the opposite ends 142, 144 of core member 38 and to engage cuff portions 140 of slot liners 138, thereby supporting core member 38 in bore 194 of transfer member 34. Arbor 48 is then lowered by fluid power cylinder 50 to its retracted position, as shown in dashed lines in FIG. 4, and is then rotated by actuator 97 to its initial position. Stator core member 38 is now properly indexed for insertion of the coils of the first phase as will hereinafter be described.

Upon return of a stator core member 38 having the first phase coils placed therein to loading/unloading station 26, it is necessary to index or rotate stator core member 38 by a predetermined amount prior to placing the next phase coils therein; the predetermined rotational indexing of stator 38 required depends on the number of poles in the wound stator, i.e. 45° for an eight pole stator, 60° for a 6 pole stator, or 90° for a two pole stator. This indexing is accomplished by moving arbor 48 upwardly from its retracted position, as shown in dashed lines in FIG. 4, to its indexing position, as shown in dashed lines at 103 in FIG. 2, and then rotating arbor 48 by means of actuator 97 by the predetermined angular amount as determined by cam switch 100 driven by belt 98, cam switch 100 being set for the desired rotation. Arbor 48 is then moved upwardly from its indexing position 103 through stator 38 to its upper position 105 as shown in FIGS. 2 and 9B. Cuff support finger elements 146 are then retracted to their inner positions, as above-described, and arbor 48 with stator 38 thereon is lowered to the indexing position 103. Arbor 48 with stator 38 thereon is then rotated by actuator 97 to its initial or home position which rotates or indexes stator 38 by the desired predetermined amount. Arbor 48 with stator 38 thereon is then moved upwardly to the upper position 105 and cuff support elements 146 are then extended and arbor 48 is lowered to its lower position as shown in FIG. 4. Stator 38 is now properly located for insertion of the second phase coils.

Figure 14:
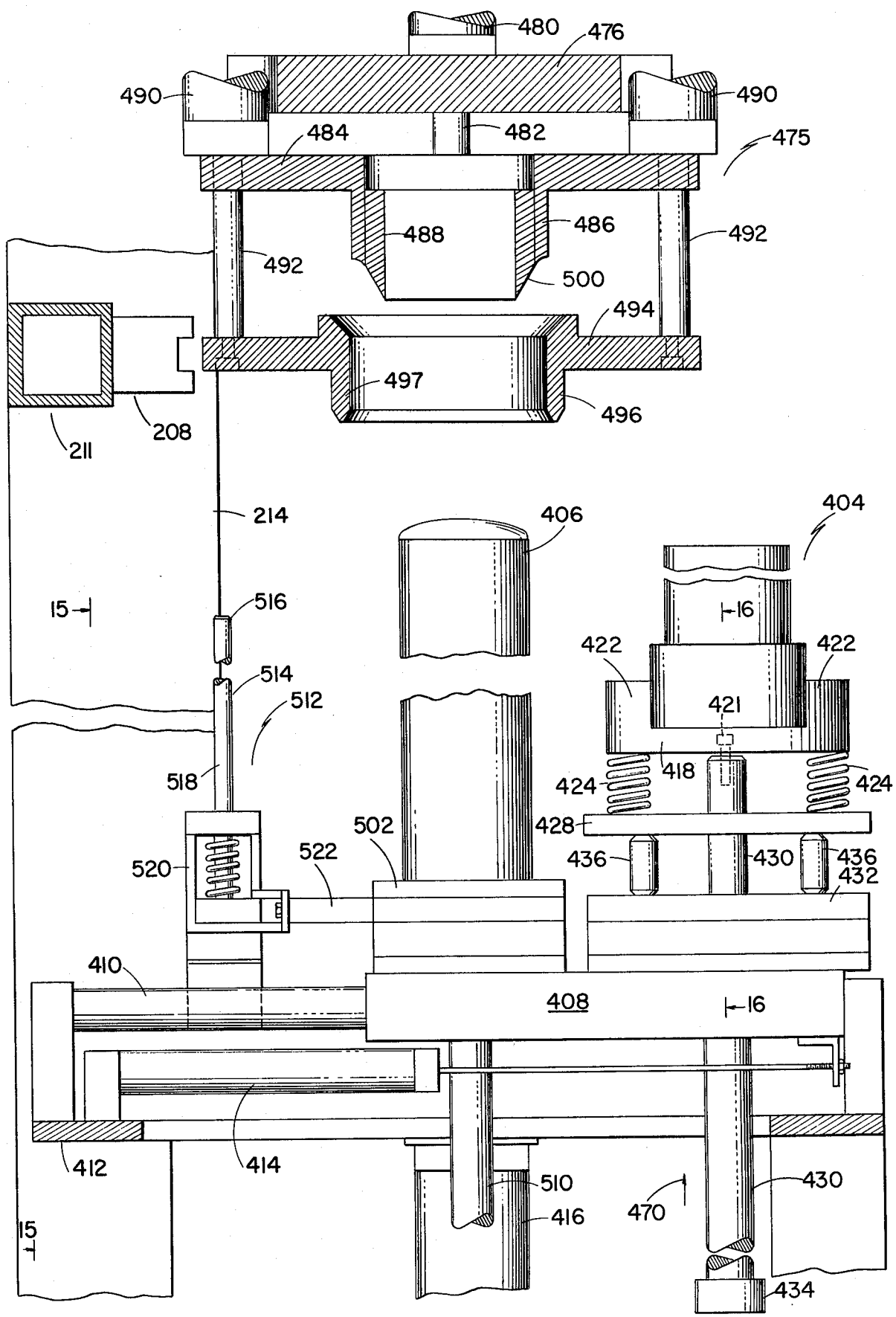
FIG. 14 is a fragmentary cross-sectional view taken generally along the line 14—14 of FIG. 1.

In order to support transfer member 34 in its loading-/unloading and preliminary end turn forming positions as shown in FIG. 2, tongue element 206 is formed at each end 104, 106 of transfer member 34 which engage slots in supports 208 on frame members 209, 211 which extend between vertical frame members 213, 214 which connect lower and upper frame sections 22, 24 (FIGS. 4, 14).

Annular plate members 113, 154 comprise lower cuff support platen 210 and annular plate members 120, 152 comprise upper cuff support platen 212. It will be seen that upper cuff support platen 212 is free-floating and that when a stator core member 38 is not loaded therein, upper cuff support platen 212 rests upon lower cuff support platen 210. Limit switch 217 (FIG. 2) detects raising of upper support platen 212 to too high a level and deactuates cylinder 50 to terminate upward movement of arbor 48 with core member 38 thereon.

Referring now to FIGS. 2, 3, 6A, 6B, 7, 8, 9A and 9B of the drawings, transfer member 34 in its position aligned with placing station 28 and drifting station 32, as shown in FIG. 3, is moved between its upper position, as shown in solid lines and a lower level, as shown in dashed lines at 216 in FIG. 3, by lift cylinder 218 which has lift rod 220 forming an extension of its piston rod extending upwardly to lift bracket 222. Lift bracket 222 has lift rods 224 depending thereon which are secured to transfer member 34 and serve to raise and lower the same. Transfer member 34 is rotated or indexed between its positions, as above described, by index plate 226 driven by index drive motor 228 through gear box 230. Guide rods 232 attached to index plate 226 guide transfer member 34 for its vertical movement between its upper and lower positions and also index transfer member 34 in response to indexing of index plate 226.

Placing apparatus 234 at placing station 28 is conventional other than as will be noted hereinafter. Placer apparatus 234 is mounted on platform 236 of lower frame section 22 and includes conventional pusher drive assembly 238, wedge magazine 241 and wedge maker assembly 243 (FIG. 3). Placer apparatus 234 comprises a circular array of elongated blade elements 240 having distal ends 242 and proximal ends 244 secured to movable mounting plate 246. Blade elements 240 are radially aligned with and axially movable with respect to elongated wedge guide elements 248 secured to mounting member 250. Mounting member 250 has flange portion 252 which carries index gear 254 which is indexed by conventional mechanism 256 (FIG. 3) thereby to index the cylindrical array of blade elements 240 for mechanically displaying the coils of each phase placed in stator core member 38. Flange portion 252 of mounting member 250 is supported on annular plate member 257 which, in turn, is secured to and supported by tooling plate 258 supported on frame platform 236.

Elongated wedge pusher elements 260 are movable in wedge guides 248 and serve to push conventional slot wedges (not shown) into slots 132 of stator core member 38 over the coil sides placed therein as is conventional in the art. Wedge pusher elements 260 have proximal ends 262 secured to pusher plate member 264 which is actuated at the proper time by a fluid power cylinder (not shown).

Figure 8:
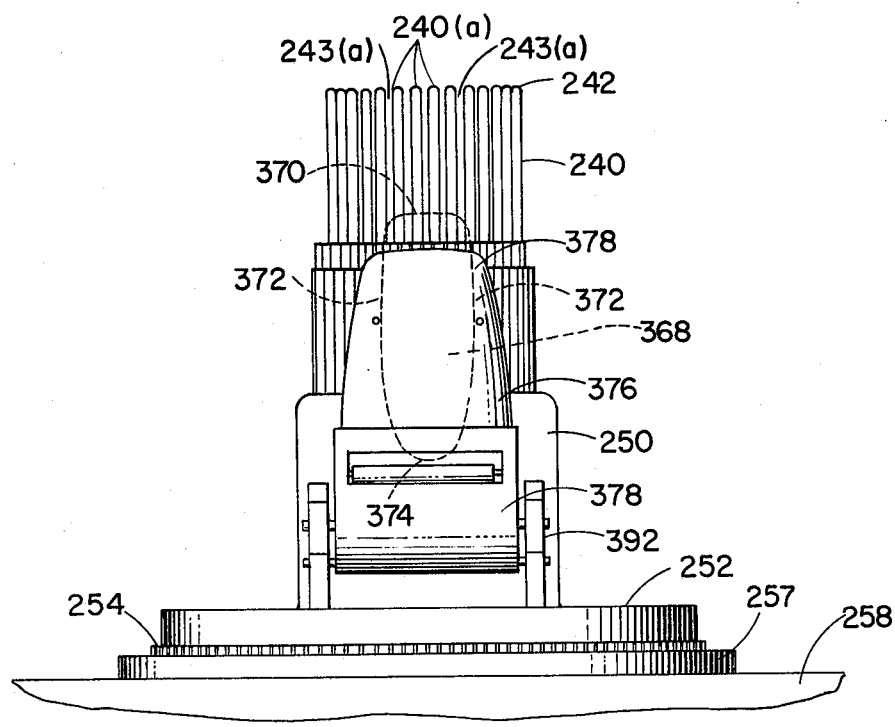
FIG. 8 is a fragmentary side view showing the placing apparatus.
Figure 9A:
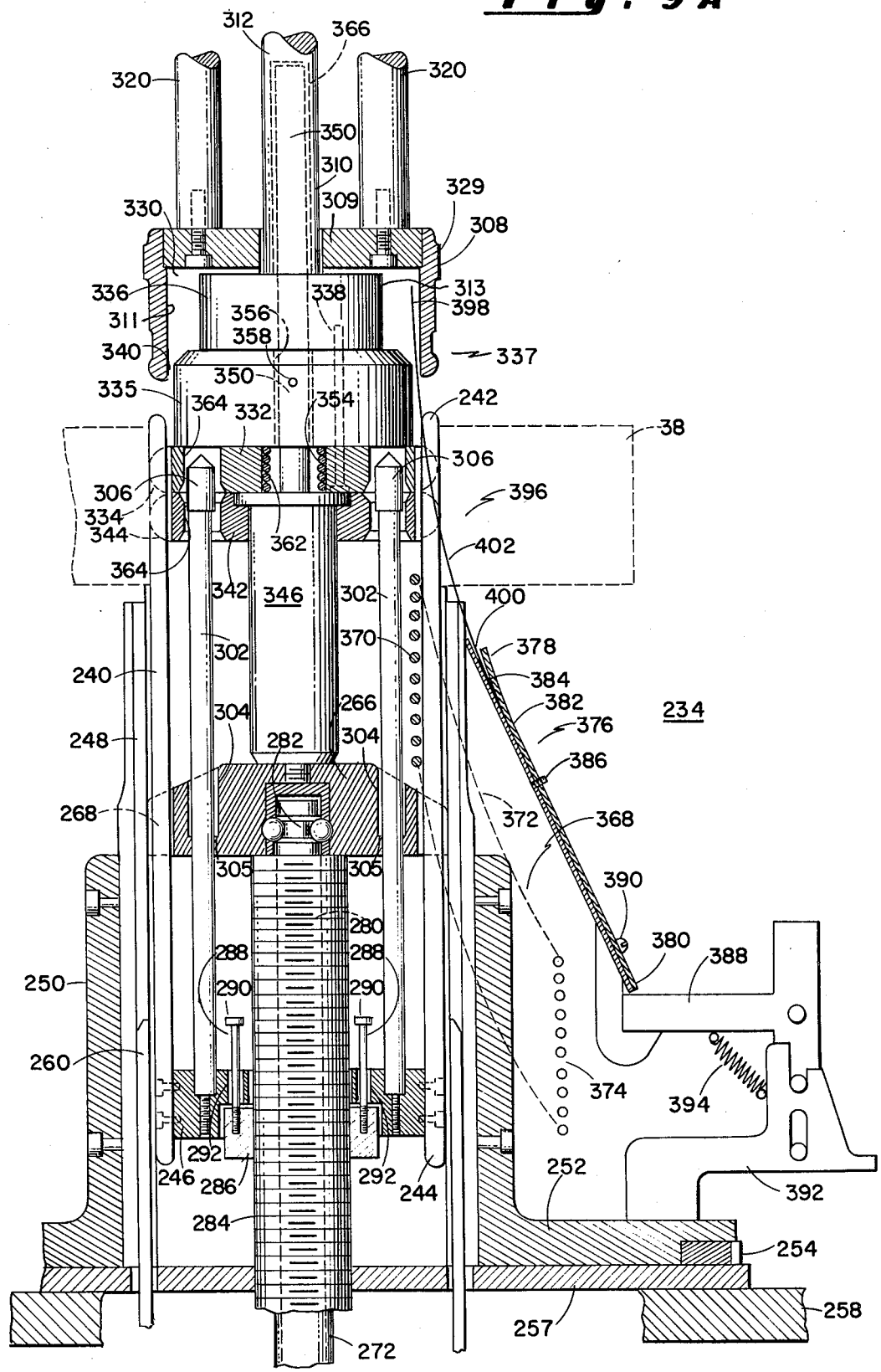
Figure 17:
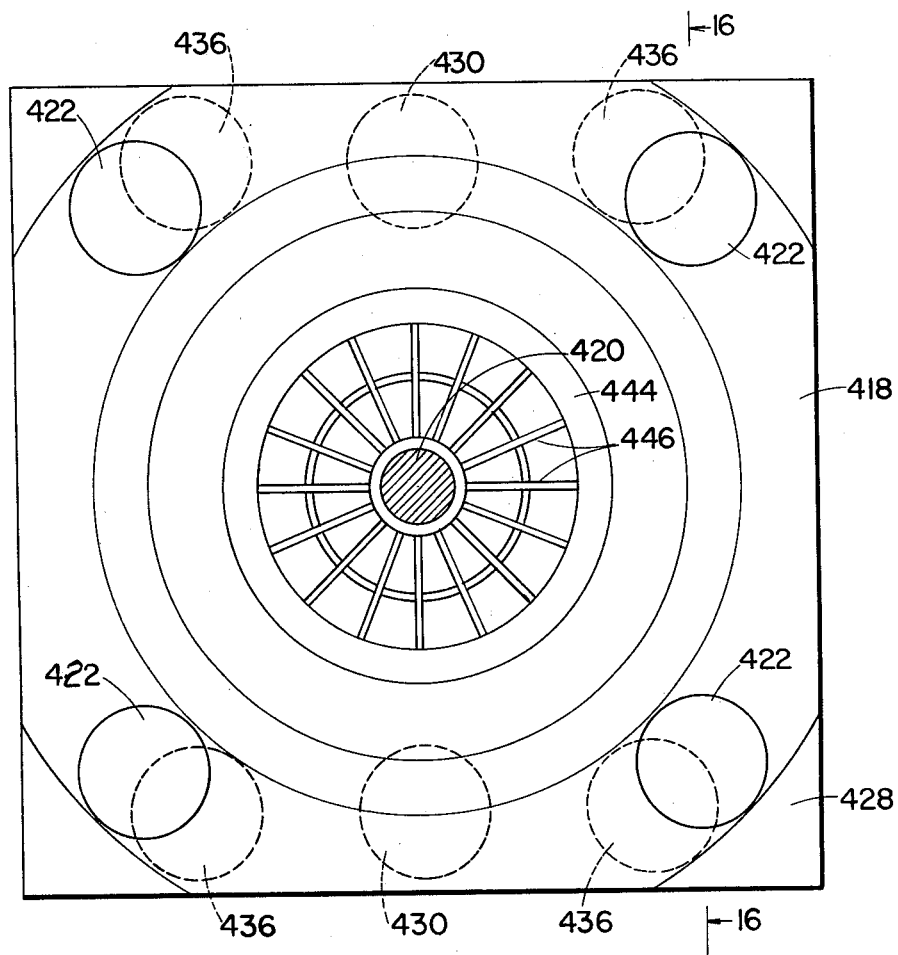
FIG. 17 is a top cross-sectional view taken generally along the line 17—17 of FIG. 16.

Conventional coil stripper member 266 is provided having portions 268 which extend into spaces 243(a) between circumferentially spaced blade elements 240 (FIG. 8). Stripper member 266 is moved axially within cylindrical array of blade elements 240 toward distal ends 242 in the direction shown by arrow 270 (FIG. 6A) by ram sleeve 272 connected to piston or drive rod 274 of a suitable fluid power cylinder (not shown). Upper end 278 of ram sleeve 272 has a threaded connection with elongated threaded element 280 which, in turn, is connected to stripper member 266 by rotatable connection 282, as best seen in FIG. 9A, in order to provide for adjustment of the height of the stripper member 266 in its retracted position, as shown in FIGS. 6A and 9A.

Surrounding ram sleeve 272 is externally threaded center tube 284 which engages stripper member 266 and has a threaded connection with plate 286; pins 288 having heads 290 extend through clearance holes 292 in blade mounting member 246 and have threaded connections with plate member 286. Pins 288 thus provide a lost-motion connection between plate 286 and blade mounting member 246. Piston rod 274 has a rotatable connection with wedge mounting plate 264 and has a member 294 thereon having dogs 296 adapted to enter slots 298 at lower end 300 of center tube 284. The threads on externally threaded element 280 and externally threaded center tube 284 have the same pitch and thus, with the tooling in the full up position with dogs 296 engaged in notches 298, rotation of ram sleeve 272 will also rotate center tube 284, thereby to adjust the height of stripper member 266 and blade elements 240.

In accordance with the invention, elongated rod elements 302 pass through clearance openings 305 in stripper member 266 which have upwardly facing enlarged portions 304, the lower ends of rod elements 302 having a threaded connection with blade mounting member 246, rod elements 302 having enlarged portions 306 formed at their upper ends.

Figure 6B:
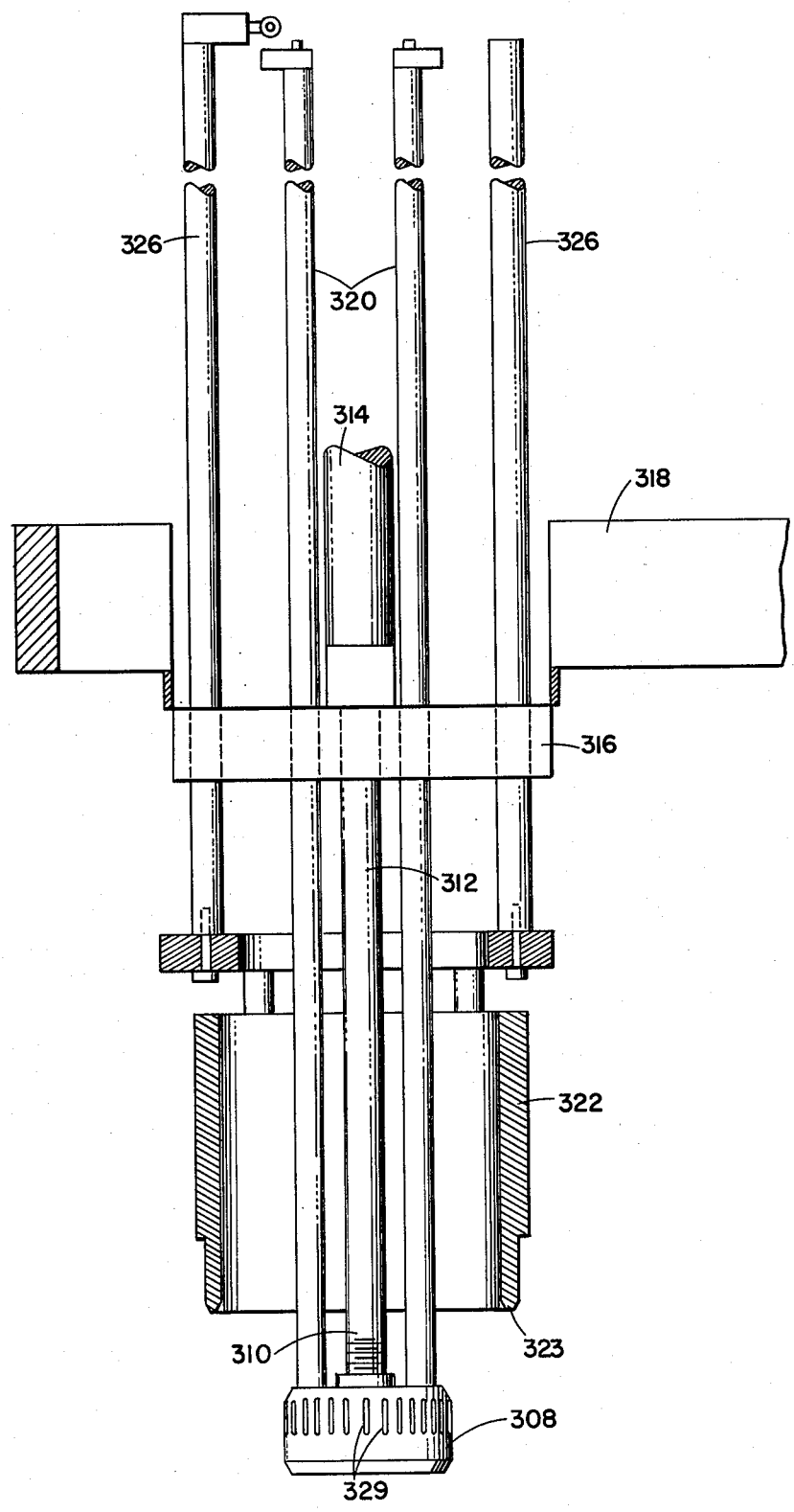

Gauge tool 308 is mounted on lower end 310 of piston rod 312 of fluid power cylinder 314 mounted on plate 316 extending across frame members 318 of upper frame section 24. (FIG. 6B). Guide rods 320 have their lower ends connected to gauge tool 308 and extend through suitable bushings in plate 316. Gauge tool 308 is moved by cylinder 314 from an upper position on the side of transfer member 34 remote from placer apparatus 234, as shown in FIG. 3, through bore 136 of stator core member 38 to a lower position adjacent distal ends 242 of blade elements 240, as shown in FIG. 9A.

Holddown clamp ring 322 surrounds piston rod 312 and guide rods 320 and is raised and lowered by suitable fluid power cylinders 324 (FIG. 1) supported on plate member 316, being guided by guide rods 326 extending through suitable bushings in plate 316. Holddown clamp ring 322 is movable by cylinders 324 from an upper position spaced above transfer member 34 as shown in FIGS. 3 and 9B, to a lower position with its edge 323 engaging the upper surface of annular plate member 120 of upper cuff support platen 212, as shown by dashed lines 328 in FIG. 9B, thereby to exert downward pressure on transfer member 34 and stator core member 38 mounted therein during the coil placing operation.

Gauge tool 308 has projections 329 on its peripheral surface which are aligned with slots 132 in stator core member 38 and thus, during movement from its upper to its lower positions, gauge tool 308 checks the alignment of slots 132. Gauge tool 308 has annular cavity 330 formed therein defined by end wall 309, outer wall 311 and inner wall 313 which is the outer surface of bearing plate member 336. Upper blade alignment tool 332 has portions 334 which extend radially outwardly into spaces 243 defined between blade elements 240. Upper blade alignment tool 332 is secured to annular plate member 335 which, in turn, is secured to bearing plate member 336, as by threaded fasteners 338. Member 335 defines annular open end 340 of cavity 330 with the wall 311 of cavity 330 in gauge tool 308 (FIG. 9A). Lower blade alignment tool 342 is provided substantially identical to upper blade alignment tool 332 and likewise having portions 344 extending radially outwardly into spaces 243 defined between blade elements 240. Upper blade alignment tool 332, annular plate member 335, bearing plate member 336, bearing plate member 336 and gauge tool 308 comprise phase insulation insertion member 337.

Lower blade alignment tool 342 has member 346 depending therefrom and having cavity 348 therein (FIG. 6A). Member 346 has elongated rod element 350 secured in its bottom wall 352 and extending upwardly through cavity 348, through central opening 354 in upper blade alignment tool 332, and through central opening 356 in plate member 335. Rod element 350 and lower blade alignment tool 342 are suspended from member 335 by means of pin 358 in slot 360 in rod element 350 (FIG. 6A). Upper and lower blade alignment tools 332, 342 are normally biased apart by spring 362 which surrounds rod element 350. Upper and lower blade alignment tools 332, 342 respectively have clearance openings 364 therethrough for receiving enlarged portions 306 of rod elements 302 when gauge tool 308 and upper and lower blade alignment tools 332, 342 are in their lower positions, as shown in FIG. 9A. In the position shown in FIG. 9A, plate member 335 engages enlarged portion 306 of rod elements 302, as shown. Opening 366 is provided in piston rod extension 312 which receives rod element 350 in the position shown in FIG. 9A.

At a time in the sequence of operation when transfer member 34 is in alignment with loading and unloading station 26 and preliminary end turn forming station 30, as shown in FIG. 2, so that unobstructed access is provided to placer apparatus 234, coils, such as coil 368 shown in FIG. 8 and FIG. 9A, are placed on at least two blade elements 240, such as blade elements 240(a) in FIG. 8, over distal ends 242 thereof, with end turn portion 370 disposed within the cylindrical array of blade elements, with side portions 372 extending outwardly between spaces 243(a) respectively on either side of the outermost blade elements 240(a), and with end turn portion 374 disposed exteriorly of the array, as best seen in FIG. 9A.

In accordance with the invention, a plurality of phase insulation shield members 376 is provided equal in number to the number of poles of each phase of the winding to be placed in slots 132 of stator core member 38. Each shield member 376 has outer end 380 and inner end 378 and, in the preferred embodiment, is formed of two, laminated, relatively thin sheets of suitable metal. Outer sheet 382 is formed at inner end 378 to define slot 384, the depth of slot 384 being determined by adjustment of threaded fastener 386. As is shown in FIG. 8, each shield member 376 spans at least blade elements 240(a) on which coil 368 is placed.

Each shield element 376 is attached adjacent its outer end 380 to mounting member 388, as by suitable threaded fasteners 390. Mounting members 388 are mounted on brackets 392 for pivotable movement between an operative position with shield members 376 inclined upwardly toward the cylindrical array of blades and with inner ends 378 engaging respective wedge guides 248, as shown in the right hand side of FIG. 6A and in FIG. 9A, and an inactive position extending radially outwardly away from blade elements 240, as shown in the left hand side of FIG. 6A. Spring 394 biases shield members 376 toward their operative positions. It will be seen that in the operative position, shield members 376 overlay side portions 372 and end turn portion 374 of coils 368.

In the operation of the apparatus thus far described as it relates to placer station 28, which phase insulation shield members 376 folded outwardly as shown in the left hand side of FIG. 6A, coils 368 are placed on blade elements 240, preferably by means of a transfer tool of the type shown in the aforesaid U.S. Pat. No. 3,686,735. The phase shield members 376 are then folded to their operative positions, as shown in the right hand side of FIG. 6A, FIG. 8 and FIG. 9A, and transfer member 34 is indexed so as to bring stator core member 38 previously loaded therein into alignment with placer apparatus 234, as shown in FIG. 3. Gauge tool 308, upper blade alignment tool 332 and lower blade alignment tool 342 are then lowered through stator core member 38 (FIG. 9B) to the position shown in FIG. 9A, plate member 335 engaging enlarged portions 306 of rod elements 302; if blade elements 240 and rod elements 302 are previously in their extended positions, plate member 335 engages enlarged portions 306 thereby to push rod elements 302 downwardly to their retracted positions, thereby moving blade elements 240 downwardly to their retracted positions, as shown in FIG. 9A, member 346 engaging stripper member 266 thereby compressing spring 362 and causing lower blade alignment tool 342 to move upwardly into abutting relationship with upper blade alignment tool 332, as also shown in FIG. 9A.

Figure 7:
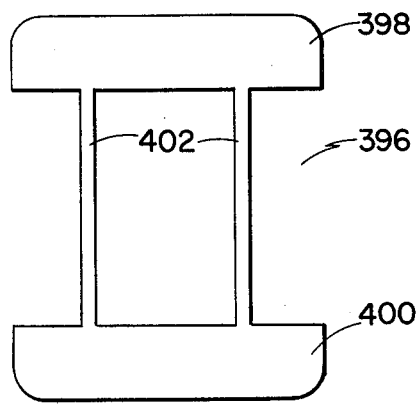
FIG. 7 is a side view showing a typical phase insulation element.

Referring additionally to FIG. 7, phase insulator elements 396 are formed of relatively thin insulating material, such as Mylar, and include opposite end portions 398, 400 joined by two spaced, parallel leg portions 402. Phase insulator 396 is hung on blade elements 240(a) over distal ends 242 (FIG. 8) with end portion 398 disposed over upper blade alignment tool 332 and extending upwardly through annular space 340 and into cavity 330 in gauge tool 308, leg portions 402 extending outwardly through spaces 243(a), and end portion 400 seated in slot 384 in shield member 376, as shown in FIGS. 8 and 9A.

Transfer member 34 is then moved downwardly to level 216 (FIG. 3) with blade elements 240 extending into bore 136 of stator core member 38, as shown in FIG. 9A. Gauge tool 308 and blade alignment tools 332, 342 are then moved upwardly, portions 334 of upper blade alignment tool 332 which extend into spaces 243(a) between blade elements 240 engaging upper end portion 398 of phase insulator 396 thus pulling phase insulator 396 upwardly through bore 136 of stator core member 38 causing leg portions 402 to enter slots 132 which respectively communicate with spaces 243(a) over the sides of coils of another phase previously placed therein. It will be observed that upper end portion 398 of phase insulator 396 is captured within cavity 330 in gauge tool 308 and is thus protected during the operation of pulling phase insulator 396 through bore 136 of stator core member 38, and that insertion of the lower end portion 400 of phase insulator 396 in slot 384 in phase shield member 376 initially guides leg portions 402 into the respective slots 132 of core member 38 and protects the phase insulator from damage during the placing operation.

Holddown clamp 322 (FIGS. 6A, 6B) is then moved downwardly so as to surround gauge tool 308 and blade alignment tools 332, 342 until its bottom edge 323 engages the upper side of annular plate member 120 of upper cuff support platen 212, as shown in dashed lines at 328 in FIG. 9B. Stripper member 266 is then moved upwardly engaging end turn portion 370 of coil 368 moving the same through bore 136 of stator bore member 38 thus causing side portions 372 to enter the respective slots 132 communicating with spaces 243(a). As stripper member 266 moves upwardly, enlarged portions 306 of rod elements 302 will enter clearance openings 304 in stripper member 266 and engage the bottoms 305 thereof so that further upward movement of stripper member 266 results in simultaneous upward movement of rod elements 302 and blade elements 240 until blade mounting member 246 engages head portions 290 of pin elements 288 at which point further upward movement of stripper member 266, rod elements 302 and blade elements 240 is arrested. This limited upward movement of blade elements 240 is provided because while it is desirable that the portions of blade elements 240 extending above upper blade alignment tool 332 in its extended position be relatively short for ease in hanging phase insulation 396 thereon, it is also desirable that the portions of blade elements 240 extending upwardly above the upper side of stator core member 38 be longer in order to protect the wedges and leg portions 402 of phase insulator 396 as stripper member 266 moves upwardly. It will be understood that in the case of a three-phase motor, phase insulators 396 are provided between the first and second, and the second and third phases.

Following placing of coils 368 in slots 132 of stator core member 38, stripper member 266 is moved in its retracted position, holddown clamp ring 322 is moved upwardly to its inactive position, and transfer member 34 with core 38 having the previously placed coils therein is raised and then indexed to the position shown in FIG. 2 so that the stator core member 38 is in alignment with the preliminary end turn forming station 30.

Referring now to FIGS. 1, 2, 14, 15, 16 and 17, preliminary end turn forming station 30 comprises end turn forming bullet 404 used for forming the end turns of the coils of the first and second phases of a stator core member having a three-phase winding, and coil centering plug 406 used on the third phase only. Bullet 404 and centering plug 406 are mounted on slide 408 for lateral movement between a position with centering plug 406 aligned with bore 136 of stator core member 38 and transfer member 34, as shown in FIG. 14, and a position with bullet 404 so aligned, as shown in FIG. 2. Slide 408 is slideably moveable on rails 410 mounted on pedestal portion 412 of lower frame section 22. Slide 408 is moved between its two positions by fluid power cylinder 414. Fluid power cylinder 416 moves whichever of bullet 404 and plug 406 is aligned with stator core member 38 from a lower, inactive position to an upper, operative position within bore member 136 of stator core member 38, as shown in dashed lines at 419 in FIG. 2.

Figure 16:
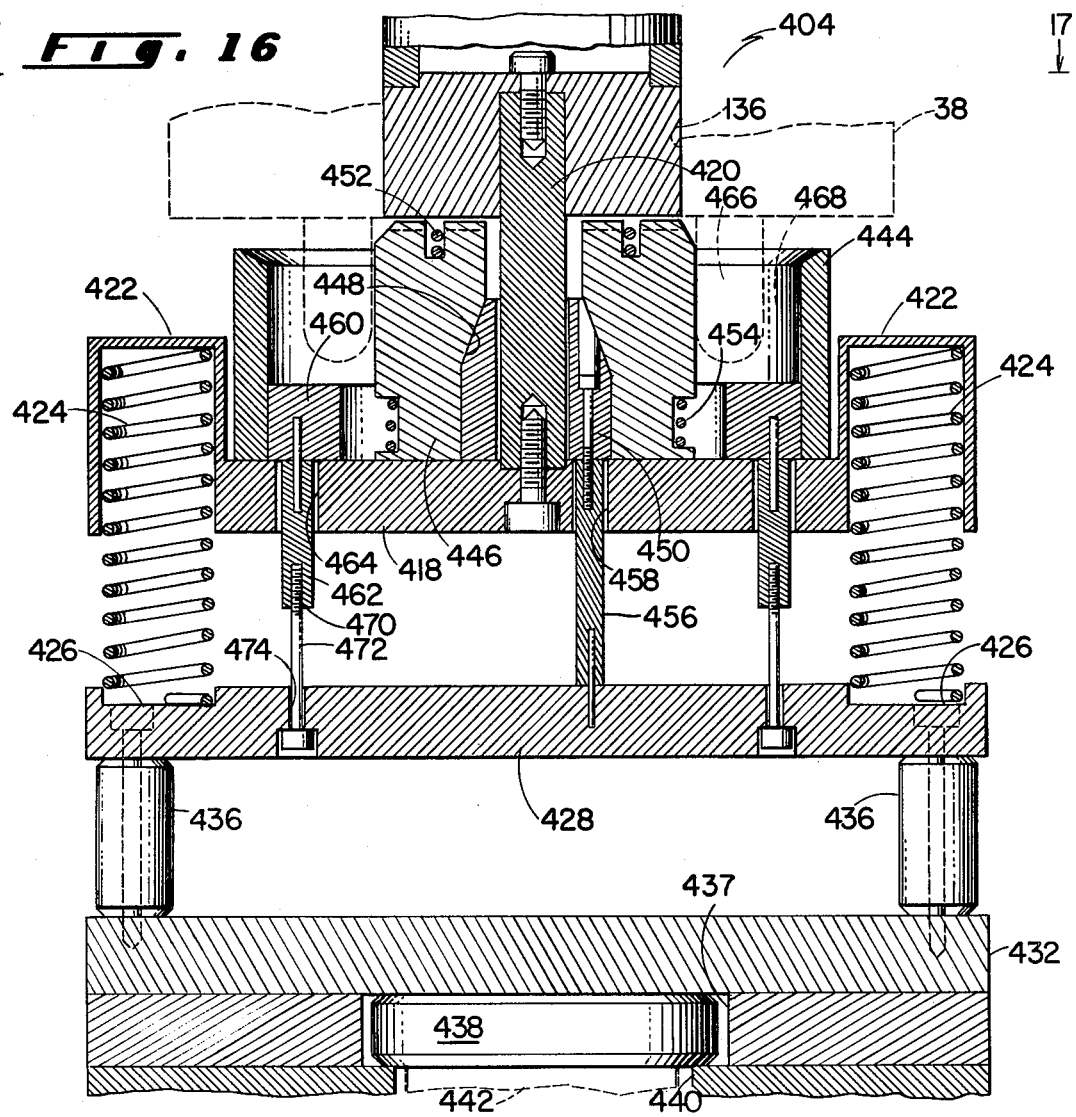
FIG. 16 is a fragmentary cross-sectional view taken generally along the line 16—16 of FIG. 14.

Referring particularly to FIGS. 14 and 16, end turn forming bullet 404 is mounted on plate member 418 by means of stud 420. Plate member 418 has four coil-receiving recesses 422 formed at its opposite corners in which the upper ends of coil springs 424 are respectively seated. The lower ends of coil springs 424 are respectively seated in recesses 426 in lower plate member 428. Guide rods 430 are respectively secured to plate member 418, as by suitable thread fasteners 421 and extend downwardly through apertures (not shown) in lower plate member 428, support 432 and slide 408, terminating at their lower ends at stop members 434. Lower plate member 428 is supported on support 432 by spacing members 436. Support 432 has cavity 437 formed therein which accommodates pad member 438. Opening 440 in support 432 communicates with cavity 437 and receives piston rod 442 of cylinder 416 when slide 408 is positioned by cylinder 414 so that bullet 404 and aperture 440 in support 432 are aligned with cylinder 416 and piston rod 442.

Lower encapsulating ring 444 is mounted on plate member 418 coaxially with post 420. End turn expanding segments 446 coaxially surround post 420 (FIG. 17) and have tapered inner cam edges 448 which cooperate with tapered cam plug 450 which coaxially surrounds post 420 and is axially movable with respect thereto. Garter springs 452, 454 urge segments 446 into engagement with plug 450. Plug 450 is connected to lower plate member 428 by post 456 which extends through clearance opening 458 in plate member 418. Blocking ring 460 surrounds segments 446 and is connected to plate member 428 by posts 462 extending through clearance opening 464 in plate 418.

In the upper, operative position of bullet 404 in bore 136 of stator core member 38, core 38 is positioned as shown in dashed lines in FIG. 16 with its end turns 466 extending into cavity 468 formed between lower encapsulating ring 444 and segments 446.

As bullet 404 is moved upwardly to its operative position within bore 136 of core member 38, as shown by arrow 470 (FIG. 14), stop members 434 on the lower ends of guide rods 430 will engage slide 408 thus arresting further upward movement of bullet 404, however, piston rod 442 of cylinder 416 has some retaining upward travel causing support 432 and plate 428 to continue upward travel by a limited amount which compresses springs 424 and causes post 456 to move cam plug 450 upwardly away from plate 418 thereby to cam segments 446 radially outwardly against the force exerted by garter springs 452,454, thereby to force end turns 466 radially outwardly away from bore 136 of stator core member 38. Following arresting of upward movement of plate member 418 by engagement of stops 434 with slide 408, bottom plate 428 continues its upward movement until its upper surface engages shoulder 470 of posts 462. Thereafter, continued upward movement of plate 428 moves posts 462 and blocking ring 460 upwardly in cavity 468 defined by encapsulating ring 444 thereby to block end turns 466, bolts 472 moving downwardly in clearance openings 474 and plate member 428.

Plate member 476 spans frame member 478 of upper frame section 24 (FIGS. 1 and 2). Fluid power cylinders 480 supported on plate member 476 have their piston rods 482 connected to plate member 484 which carries upper end turn forming ring 486 having bore 488 coaxial with bore 136 of stator core member 38 when transfer member 34 is positioned in alignment with preliminary end turn forming station 30, as shown in FIG. 2. Fluid power cylinders 490 are supported on plate 484 and have their piston rods 492 connected to plate member 494 which carries upper encapsulating ring 496 having central bore 497 coaxial with bore 488 of upper forming ring 486. Guide rods 498 (FIGS. 1 and 2) attached to plate 494 and extending through plate members 484 and 476 guide plate members 494 and 484 for vertical movement.

With transfer member 34 indexed so that stator core member 38 having the first phase, or the first and second phase coils placed therein indexed to the position shown in FIG. 2 in alignment with preliminary end turn forming station 30, and with slide 408 positioned so that bullet 404 is coaxially aligned with bore 488 in upper end turn forming ring and bore 497 in upper encapsulating ring 496, cylinders 490 are actuated to lower plate member 494 so that upper encapsulating ring 496 surrounds the upper end turns of the coils previously placed in stator core member 38, in the same manner as lower encapsulating ring 444 surrounds lower end turns 466 (FIG. 16). With bullet 404 raised as above-described, to extend through bore 136 of stator core member 38, cylinder 480 is actuated to lower plate 484 and upper end turn forming ring 486 into bore 497 of upper encapsulating ring 496 so that tapered surface 500 engages the upper end turns thereby to form and block the same.

Figure 15:
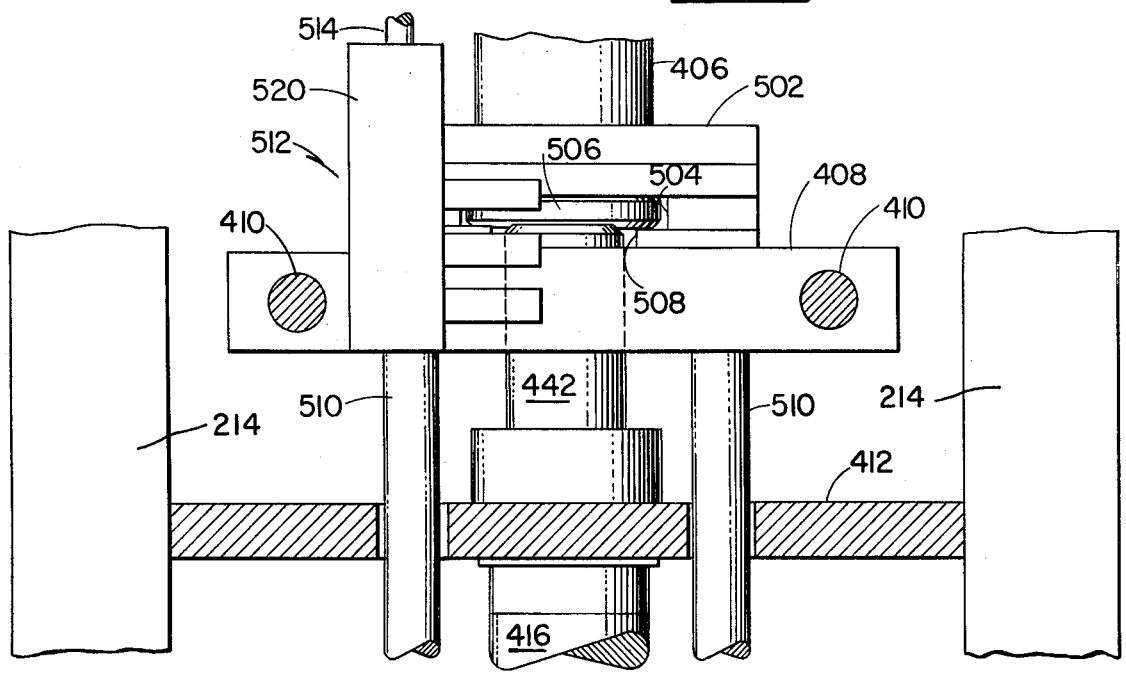
FIG. 15 is a fragmentary cross-sectional view taken generally along the line 15—15 of FIG. 14.

The upper end turns of the coils forming the third phase of the winding placed in stator core member 38 may not be centered in slots 132, i.e., may not extend beyond the upper surface of stator core member 38 the same distance as the lower end turns extend beyond the lower surface and thus, it may be necessary to pull the upper end turns upwardly in order to center the coils of the third phase. In order to perform this function, with transfer member 34 positioned with stator core member 38 having the coils of all three phases previously placed therein in alignment with preliminary end turn forming station 30, slide 408 is moved to position coil centering plug 406 in alignment with bore 136 of stator core member 38 and in alignment with piston rod 442 of fluid power cylinder 416 (FIGS. 14, 15). Centering plug 406 is mounted on support 502 which has cavity 504 therein in which pad 506 is positioned, piston rod 442 of cylinder 416 moving upwardly through aperture 508 in support 502 to engage pad 506 and thereby raise coil centering plug 406 into and through bore 136 of stator core member 38 so as to engage the upper end turns and thereby to push the coils of the third phase upwardly so as to be properly centered to provide end turns of equal length on the opposite sides of the core members. Guide rods 510 extending through slide 408 and connected to support 502 guide support 502 and plug 406 for vertical movement.

In the case of the coils forming the third phase, it is necessary to arrest the upward movement of coil containing plug 406 and then to reverse its movement upon predetermined penetration through bore 136 of stator core member 38 which, of course, depends upon the stack height of the core. In order to sense the requisite penetration, automatic stack switch assembly 512 is provided (FIG. 14) which comprises elongated rod element 514 having distal end 516 and its proximal end 518 connected to switch actuating assembly 520. Automatic stack switch assembly 512 is connected to support 502 for coil centering plug 406 by bracket 522 and thus, when coil centering plug 406 has been raised the requisite amount, distal end 516 of sensing rod 514 engages abutment 215 on upper cuff support platen 212 thereby actuating switch assembly 520 to reverse cylinder 416 so as to lower coil centering plug 406.

Referring now to FIGS. 1, 3 and 13, coil-drifting member or drift bullet 524 is located at drift station 32 and is mounted on plate member 526. Fluid power cylinders 528 are mounted on bracket 530 connected to platform portion 532 of lower frame section 22 and have their piston rods 534 connected to plate member 526 thereby to raise plate member 526 and drift bullet 524 from the position shown in solid lines in FIG. 3 to the position shown in dashed lines at 524(a) in bore 136 of core member 38 mounted in transfer member 34 when transfer member 34 is lowered to its lower position shown in dashed lines at 216 in FIG. 3.

Drift bullet 524 has drift fins 536 therein which, when extended radially outwardly, enter slots 132 of stator core member 38 thereby to drift or compact the coil sides therein radially outwardly. Drift fins 536 are biased to their normal, retracted positions by garter springs 538, 540, and are moved to their radially extended positions by plug member 542 having cam surface 544 cooperating with cam edges 546 on drift fins 536. Expanding plug member 542 is connected to piston rod 548 of cylinder 550 mounted on plate member 526, extension of piston rod 548 moving expanding plug member 542 upwardly thereby to cam drift fins 536 radially outwardly to their extended, drifting positions. The position of the lower surface of stator core member 38 and lower end turns 466 when drift plug 524 is raised into bore 136 is shown in dashed lines in FIG. 13. It will be seen that expansion of drift fins 536 to their extended positions will not only drift the coils radially outwardly in slots 132, but will also form end turns 466 outwardly away from bore 136.

Upper end turn forming assembly 552 is provided at drift station 32 which is very similar to upper end turn forming assembly 475 at preliminary end turn forming station 30 and thus, the same reference numerals are employed for the component parts of upper end turn forming assembly 552 as were employed for upper end turn forming assembly 475. The only essential difference between upper end turn forming assembly 552 at drifting station 32 and upper end turn forming assembly 475 at preliminary end turn forming station 30 resides in the fact that upper end turn forming ring 486 has radially extending slots 554 communicating with bore 488 for accommodating drift fins 536 in their extended positions. In the case of upper end turn forming assembly 552, plate member 476 spans frame members 556 of upper frame section 24.

OPERATION

Referring to FIGS. 1 through 5 of the drawing, with transfer member 34 initially positioned with its opposite ends 104, 106 respectively aligned with load/unload station 26 and preliminary end turn forming station 30, as shown in FIG. 2, and with core loading and unloading arbor 48 lowered to its lower position (FIG. 4), a tray 40 with an unwound stator core member 38 thereon having slot liners 138 previously placed therein, is placed on starting end 80 of conveyor 35 which moves the same in the direction shown by arrow 42 toward the loading position, stop pins 93 being lowered and stop pins 92 being raised so as to stop tray 40 with bore 136 of stator core member 38 aligned with opening 84 in plate member 86 and load/unload arbor 48. Load-/unload arbor 48 is then raised into bore 136 of stator core member 38 by cylinder 50, arbor 48 being rotated, as need be, by rack and pinion cylinder mechanism 97 so that fins 74 enter slots 132 as described in greater detail above. With arbor 48 properly located in bore 136 of stator core member 38, raising of arbor 48 in direction 102 continues to the position shown in dashed lines in FIG. 2 with stator core member 38 positioned in the bores of lower and upper cuff support platens 210, 212 (FIG. 9B). Cylinder 176 is then actuated to raise member 178, thereby to raise shaft 162 so that tongue 166 engages the notch in member 184, and cylinder 186 is actuated thereby to extend cuff support fingers 146 to engage lower and upper sides 142, 144 of stator core member 38 and cuffs 140 of slot liners 138, all as above-described in greater detail. Arbor 48 is then lowered by cylinder 50 to its retracted position as shown in dashed lines at FIG. 4.

Transfer member 34 is then indexed 90° so that its ends 104, 106 are respectively aligned with placer station 28 and drift station 32, as shown in FIG. 3, stator core member 38 thus being coaxially aligned with placer apparatus 234. Transfer member 34 is then lowered by cylinder 218 to its lower position, as shown in dashed lines at 216 in FIG. 3, and the coils forming the first phase are placed in slots 132 of stator core member 38 as above-described in greater detail, it being observed that phase insulators 396 are not placed in slots 132 during placing of the coils forming the first phase.

Transfer member 34 is then indexed by indexing drive motor 228 to its position with its ends 104, 106 in alignment with preliminary end turn forming station 30 and load/unload station 26, respectively, as shown in FIG. 2, with stator core member 38 having coils of the first phase placed therein aligned with end turn forming bullet 404, as shown. Cylinder 416 is then actuated to raise bullet 404 as shown by arrow 405 to its operative position within bore 136 of stator core member 38, as shown in dashed lines at 419 in FIG. 2, and upper end turn forming assembly 475 is actuated thereby preliminarily to form the end turns of the opposite sides of stator core member 38, as above-described in greater detail. It will be observed that while the end turns of the coils forming the first phase of the winding in stator core member 38 are being formed at preliminary end turn forming station 30, another unloaded core member 38 may be loaded on the other end of transfer member 34 at load/unload station 26.

Transfer member 34 is then indexed again by 90° to the position shown in FIG. 3 with the stator core member 38 having the coils of the first phase placed therein in radial alignment with drift plug 524 at drift station 32. Transfer member 34 is then lowered to its lower position shown in dashed lines at 216 in FIG. 3 and drift plug 524 is raised in the direction shown by arrow 525 to its position shown in dashed lines 524(a) in FIG. 3 in bore 136 of stator core member 38, upper end turn forming assembly 552 also being actuated, all as above-described in greater detail. It will be observed that while the coils forming the first phase are being drifted at drift station 32, another set of coils may be placed in the other stator core member 38 at the other end of transfer member 34 at placer station 28.

Transfer member 34 is then indexed by 90° so that stator core member 38 with the first phase coils placed and drifted coils therein is again in alignment with load-/unload station 26 and the second stator core member 38 having the newly placed coils therein is in alignment with the preliminary end turn forming station 30. After forming of the end turns of the coils in the second stator core member 38, transfer member 34 is again indexed by 90° so that the stator core member 38 having the first phase coils previously placed and drifted therein is again in alignment with placing station 28, as shown in FIG. 3. The coils forming the second phase along with phase insulators 396 are then placed in slots 132, all as above described, and the operation then continues until a stator core member 38 having the coils of all three phases placed and drifted therein arrives at load/unload station 26. Arbor 48 is then raised into bore 136 of stator core member 38, cylinders 176 and 186 are actuated thereby to retract cuff support fingers 146, and the fully wound stator core member is then lowered by arbor 48 to a position between clamps 52, 54. Clamps 52,54 are then extended by cylinders 56,62, 64 to engage core member 38, arbor 48 is lowered out of bore 136, and actuator 58 is actuated to invert the fully wound core member 38 so that the leads now extend upwardly.

Arbor 48 is then raised again into bore 136, clamps 52, 54 are retracted, and arbor 48 then lowers core 38 onto tray 40 on conveyor 34. Stop pins 92 are then lowered, stop pins 93 are raised, and the fully wound stator core member 38 is moved in the direction shown by the arrow 46 in FIG. 5 off conveyor 34 while another unwound stator core member 38 is moved into the loading position, all as above described.

While there have been described above the principles of the invention in connection with specific apparatus, it is to be clearly understood that this description is made only by way of example and not as a limitation to the scope of the invention.

What is claimed is:

1. An apparatus for placing coils in the slots of an internally slotted dynamoelectric machine stator core member in which the slots are defined by radially inwardly extending teeth having inner ends which define a bore, the apparatus comprising a cylindrical array of elongated, circumferentially spaced blade elements for extending through the bore and respectfully to engage the inner ends of the stator core member teeth with the spaces between the blade elements communicating respectively with the core member slots, the blade elements respectively having distal ends and proximal ends, means for mounting the blade elements adjacent the proximal ends thereof, a stripper member axially movable within the array between retracted and extended positions and having portions extending into the spaces between the blade elements, and first power means including a drive rod for moving the stripper member toward its extended position thereby to engage the one end turn portion of a previously-wound coil placed over the distal ends of at least two blade elements with the one end turn portion of the coil within the array between the stripper member and the distal ends, with the side portions of the coil respectively extending through two spaces respectively on either side of the two blade elements, and with the other end portion of the coil being disposed on the exterior of the array, and to push the one end turn portion through the core member bore so that the coil side portions enter a respective two of the core member slots, the improvement comprising: a phase insulation insertion member axially movable between a first position axially aligned with and spaced from the distal ends of the blade elements and a second position within the array between the one end portion of the coil and the distal ends of the blade elements, said insertion member having portions which extend into the spaces between the blade elements in said second position thereof; and second power means for moving said insertion member between said positions thereof independently of movement of the first power means drive rod and the stripper member whereby a phase insulation element having opposite end portions joined by two spaced leg portions may have one end portion thereof placed over the distal ends of the two blade elements with the leg portions extending through two of said spaces, and with the other end portion being disposed on the exterior of the array when said insertion member is in said second position thereof so that movement of said insertion member toward said first position thereof prior to movement of the stripper member toward the distal ends pulls the phase insulation element through the core member bore with the leg portions entering the two core member slots which communicate with the two spaces over the sides of previously inserted coils therein.

2. The apparatus of claim 1 further comprising a shield member movable between a first position overlaying the side portions and other end portion of the coil on said two blade elements, and a second position spaced radially outwardly from said array, the other end portion of the phase insulation element in said second position of said insertion member being supported on said shield member in said first position thereof.

3. The apparatus of claim 2 wherein said shield member is formed of relatively thin sheet material and in said first position thereof spans said two blade elements.

4. The apparatus of claim 3 further comprising a frame, said shield member having outer and inner ends with said outer end being pivotally mounted on said frame, said shield member in said first position thereof being inclined toward said array with said inner end thereof being adjacent said two blade elements and extending toward said distal ends thereof, said shield member being spring-biased toward said first position thereof.

5. The apparatus of claim 4 wherein said shield member has a slot formed therein adjacent said outer end thereof for receiving the other end portion of said phase insulation element.

6. The apparatus of claim 1 wherein said phase insulation insertion member includes another portion remote from the one end turn portion of the coil on the two blade elements and having an end wall and spaced inner and outer side walls defining a cavity with an open end facing said distal ends of said blade elements for receiving the one end portion of the phase insulation element.

7. The apparatus of claim 1 further comprising a frame having a first section with said blade mounting means and first moving means mounted thereon, and a second section spaced from the distal ends of said blade elements with said insertion member and second moving means mounted thereon.

8. The apparatus of claim 7 further comprising a transfer member mounted on said frame for movement between a first position at a coil placing station and another position removed therefrom, said transfer member having means thereon for removably mounting the core member thereon, the bore of the core member in said first position of said transfer member being axially aligned with the array of blade elements, said phase insulation insertion member in said first position thereof being axially aligned with the core member bore in said first position of said transfer member and being on the side thereof remote from the distal ends of said blade elements, said insertion member during movement between said positions thereof passing through the core member bore.

9. The apparatus of claim 8 wherein said transfer member in said first position thereof is further movable between an inactive position with the core member axially spaced from the distal ends of the blade elements and a coil insertion position with the array of blade elements extending through the core member bore.

10. The apparatus of claim 9 further comprising a gauge member mounted on said phase insulation insertion member on the side thereof toward said second moving means and movable with said insertion member, said gauge member having means thereon for gauging the alignment of the core member slots and the size and concentricity of the core member bore upon movement of said insertion member from said first to said second position thereof.

11. The apparatus of claim 10 wherein said gauge member has a portion thereon which defines an annular space for receiving the one end portion of the phase insulation element thereby to protect the same during positioning of the core member on the array of blade elements.

12. The apparatus of claim 9 further comprising a hold-down clamp member mounted on said second frame section for movement between an inactive position spaced from said transfer member in said first position thereof on the side thereof remote from the distal ends of said blade elements, and an active position engaging the core member in said coil insertion position of said transfer member thereby to hold the core member on said blade elements during insertion of coils in the slots thereof.

13. The apparatus of claim 12 wherein said clamp member is annular and concentric with said insertion member, said second moving means including a portion extending through said clamp member.

14. The apparatus of claim 1 wherein the blade mounting means with the blade elements mounted thereon is axially movable from a normal to an extended position, and means for providing a lost-motion connection between the stripper member and the blade mounting means whereby after movement of the stripper member by a predetermined distance away from the retracted position toward the extended position thereof the blade mounting means and blade elements are moved axially from said normal to said extended position thereof with the stripper member.

15. The apparatus of claim 14 wherein said lost-motion means comprises an elongated member having an end connected to said blade mounting means and extending through a clearance opening in said stripper member to an enlarged end, said stripper member in said retracted position being spaced from said enlarged end by said predetermined distance, said enlarged end being engaged by said stripper member upon movement toward said extended position thereof by said predetermined distance whereby the blade mounting means and blade elements move axially in unison with the stripper as the same is moved to the extended position thereof.

16. The apparatus of claim 15 further comprising means for limiting said movement in unison of the blade mounting means, blade elements and stripper member to a second predetermined distance.

17. The apparatus of claim 16 wherein said first moving means comprises a fluid power cylinder mounted on said frame and having a piston rod extension connected to the stripper member, a sleeve member surrounding the piston rod extension and having an end engaging the stripper member in the retracted position thereof, the sleeve member having a threaded connection with the frame for selectively establishing the retracted position of the stripper member and the first-named predetermined distance, the blade mounting means comprising a plate element axially movable on said sleeve member, said limiting means comprising a stop member having a threaded connection with the sleeve member thereby to establish said normal position of the plate element and blade elements, and an elongated element having an end secured to said stop member and extending through a clearance opening in said plate element to an enlarged head portion said plate element in said normal position thereof engaging said stop member with said second predetermined distance therefrom to said head portion of said elongated element.

18. The apparatus of claim 15 wherein said phase insulation insertion member has a portion thereon which engages said enlarged end of said elongated member in said extended position thereof as said insertion member is moved to said second position thereof thereby to return the blade mounting means and blade elements to said normal position thereof.

19. The apparatus of claim 18 wherein said phase insulation insertion member has an aperture therein which in said second position thereof receives said enlarged end of said elongated member in said extended position thereof, said insertion member portion closing said aperture.

20. The apparatus of claim 8 wherein said array has a first longitudinal axis, said transfer member being rotatable about a second axis spaced from and parallel with said first axis thereby to move said transfer member between said first and other positions thereof, said means for removably mounting said core member being coaxial with said first axis in said first position of said transfer member.

21. The apparatus of claim 8 wherein the slots of the core member have liners formed of insulative material respectively therein, each liner having cuff portions respectively extending on opposite sides of the core, and wherein said means for removably mounting said core member comprises a pair of cuff support assemblies for supporting the core member therebetween, each said cuff support assembly comprising a plurality of elongated finger elements having inner ends for engaging said cuffs and being movable radially between inner, cuff-engaging positions in outer, inactive positions.

22. The apparatus of claim 21 wherein said transfer member is movable from a loading and unloading position at a loading and unloading station to said first position, each of said cuff support assemblies including an annular plate member having a surface normal to the axis of the bore of the core member, each said surface having a plurality of grooves formed therein extending helically with respect to said axis, said finger elements having cam means respectively cooperating with said grooves for moving said finger elements between the positions thereof in response to rotation of the respective annular plate member, and means at said loading and unloading position for selectively rotating said annular plate members.

23. The apparatus of claim 8 wherein said transfer member is movable from a loading and unloading position at a loading and unloading station to said first position and further comprising means at said loading and unloading station for moving an unwound stator core member into said means for removably mounting said core member and for removing a wound stator therefrom, and means at said loading and unloading station for inverting a wound stator core member after its removal from said core member mounting means.

24. The apparatus of claim 8 wherein said transfer member is movable from a loading and unloading position at a loading and unloading station to said first position, and further comprising an arbor member for receiving the bore of an unwound stator core member thereon, said arbor member having fin elements thereon removable from a retracted position to an extended position for respectively extending into the slots of the core member thereon, and means for moving said arbor member with a core member thereon into said means for removably mounting said core member.

25. The apparatus of claim 24 further comprising means on said arbor member for sensing failure of said fin elements to enter the core member slots by reason of misalignment of the core member on said arbor member, and means for rotating said arbor member with respect to the core member in response to the sensing means thereby to correct such misalignment.

26. The apparatus of claim 25 wherein said rotating means comprising means for engaging an index notch on the periphery of the core member while on said arbor member, and means for moving said engaging means thereby to rotate the core member on said arbor member for positioning the core member for placing coils of another phase.

27. The apparatus of claim 8 wherein said transfer member is movable from said first position to a second, end turn-forming position at an end turn-forming station, and further comprising a coil centering member and an end turn forming member mounted on a support on one of said frame sections, said support being movable between centering and forming positions, the bore of a wound core member in said second position of said transfer member being in axial alignment with said centering member in said centering position of said support and in axial alignment with said forming member in said forming position of said support, said forming member including first means for forming the end turns at one end of a wound stator core member radially outwardly away from the bore thereof, third means for moving said centering member in said centering position of said support relative to said transfer member in said second position thereof from an inactive position to an active position in the bore of the wound stator core member thereby to force the coil sides into the slots of the core member, and for moving said end turn forming member in said forming position of said support relative to said transfer member in said second position thereof from an inactive position to an active position with said first means for forming the end turns engaging the end turns at one end of the wound stator core member, the other of said frame sections having second means thereon for forming the end turns at the other end of a wound stator core member radially outwardly away from the bore thereof in said second position of said transfer member.

28. The apparatus of claim 27 further comprising means carried by said centering member for sensing penetration of said centering member through the core member bore and for causing reversal of said third moving means in response thereto thereby to withdraw said centering member from the bore.

29. The apparatus of claim 27 wherein the end turn forming member includes a portion for entering the bore of the core member in said coil forming position thereof.

30. The apparatus of claim 29 wherein said first means for forming the end turns comprises radially expansible elements and means for expanding the same in response to said movement of said forming member to said forming position, and wherein said second means for forming the end turns includes means for moving the same relative to said transfer member to a forming position cooperating with said end turn-forming member portion and engaging the end turns at the other end of the wound stator core member.

31. The apparatus of claim 27 wherein said transfer member is movable from said second position to a third, coil drifting position at a drift station, and further comprising a coil drifting member on one of said frame sections axially aligned with the bore of a wound stator core member in said third position of said transfer member, fourth means for moving said drifting member relative to said transfer member in said third position thereof from an inactive position to a drifting position in the bore of a core member, said drifting member having a plurality of drift fins thereon movable radially between a retracted position and an extended position for entering the slots of the core member and to drift the coils radially outwardly therein, and third means on the other frame section cooperating with said drifting member for forming the end turns at the respective end of a wound stator core member radially outwardly away from the bore in said third position of said transfer member.

32. The apparatus of claim 31 further comprising means for camming said drift fins between said position thereof.

33. The apparatus of claim 31 wherein said fourth moving means comprises means for moving said transfer member in said third position thereof between an inactive position spaced from said drifting member and a drifting position, and means for moving said drifting member between said positions thereof, and further comprising fifth means for moving said third means for forming the end turns from an inactive position to a forming position cooperating with said drifting member in the drifting position thereof with said transfer member in its drifting position.

34. The apparatus of claim 31 wherein said transfer member is movable from a loading and unloading position at a loading and unloading station to said first position and from said third position to said loading and unloading position, and further comprising means at said loading and unloading station for moving an unwound stator core member into said core mounting means and for removing a wound stator core member therefrom, and means at said loading and unloading station for inverting a wound stator core member after removal thereof from said core mounting means.

35. Apparatus for placing coils and phase insulation in slots of a dynamoelectric machine stator core member comprising: a first core loading and unloading station; a second coil and phase insulation placing station; a third preliminary coil end turn forming station; and a fourth coil drifting station; means for transferring a core successively from said first station to said second, third and fourth stations and back to said loading and unloading station; and means at said loading and unloading station for inverting a wound core member.

36. A method of placing coils and phase insulation elements in slots of an internally slotted dynamoelectric machine stator core member in which the slots are defined by radially inwardly extending teeth having inner ends which define a bore comprising the steps of providing a cylindrical array of circumferentially spaced elongated blade elements for extending through the bore and respectively to engage the inner ends of the stator core member teeth with the spaces between the blade elements respectively communicating with the slots therein, the blade elements respectively having distal ends, placing a previously wound coil on two of the blade elements over the distal ends thereof with one end turn portion disposed within the array, with the two coil sides respectively extending outwardly through the spaces respectively on either side of the two blades, and with the other end turn portion disposed exteriorly of the array, moving a phase insulation insertion member into the array from the distal ends of the blade elements over the one end turn portion of the coil thereon, the insertion member having portions extending centrally in the spaces between the blade elements, placing a phase insulation element having opposite end portions joined by two spaced leg portions on the two-blade elements over the distal ends thereof and over the coil thereon with one end portion disposed within the array over the insertion member, with the two leg portions extending outwardly through the two spaces, and with the other end portion disposed externally of the array, placing a stator core member having at least one coil previously placed in two other slots thereof on the blade elements over the distal ends thereof, moving the insertion member out of the array thereby pulling the one end portion of the phase insulation element through the core member bore so that the leg portions respectively enter the two slots which communicate with the two spaces, thereafter pushing the one end turn portion of the coil out of the array thereby causing the side portions thereof to enter the two core member slots, and placing a shield member over the side and other end turn portions of the coil prior to the phase insulation placing step, the shield member supporting the other end of the phase insulation element prior to said moving step.

37. The method of claim 36 wherein said insertion member has a portion which extends away from the distal ends of the blade elements and which has a recess therein, said phase insulation placing step including the step of inserting the one end portion of the phase insulation element in said recess thereby to protect the same during said core member placing step.

38. A method of placing coils and phase insulation in slots of a dynamoelectric machine stator core member comprising the steps of: loading an unwound core member in a transfer member at a loading and unloading station; moving said transfer member with the core thereon to a coil and phase insulation placing station; placing coils and phase insulation in the slots of the core member at said placing station; moving said transfer member with said core thereon to a preliminary coil end turn forming station; forming the end turns of the coils in the slots of the core member away from the bore of the core member at said preliminary coil end turn forming station; moving the transfer member with the core thereon to a coil drifting station; drifting the coils in the slots of the core member at said drifting station; moving said transfer member with the wound core member thereon to said loading and unloading station; unloading the wound core member from said transfer member; and inverting the wound core member.

39. An apparatus for placing coils in the slots of an internally slotted dynamoelectric machine stator core member in which the slots are defined by radially inwardly extending teeth having inner ends which define a bore, the apparatus comprising a cylindrical array of elongated, circumferentially spaced blade elements for extending through the bore and respectfully to engage the inner ends of the stator core member teeth with the spaces between the blade elements communicating respectively with the core member slots, the blade elements respectivey having distal ends and proximal ends, means for mounting the blade elements adjacent the proximal ends thereof, a stripper member axially movable within the array between retracted and extended positions and having portions extending into the spaces between the blade elements, and power means including a drive rod for moving the stripper member toward its extended position thereby to engage the one end turn portion of a previously wound coil placed over the distal ends of at least two blade elements with the one end turn portion of the coil within the array between the stripper member and the distal ends, with the side portions of the coil respectively extending through two spaces respectively on either side of the two blade elements, and with the other end portion of the coil being disposed on the exterior of the array, and to push the one end turn portion through the core member bore so that the coil side portions enter a respective two of the core member slots, the improvement comprising: a phase insulation insertion member axially movable between a first position axially aligned with and spaced from the distal ends of the blade elements and a second position with a portion within the array between the one end portion of the coil and the distal ends of the blade elements, said insertion member including another portion remote from said distal ends of said blade elements and having an end wall and spaced inner and outer side walls defining a cavity with an open end facing said distal ends of said blade elements whereby a phase insulation element having opposite end portions joined by two leg portions may have one end portion thereof received in said cavity through said open end thereof with the leg portions extending through two of said spaces, and with the other end portion being disposed on the exterior of the array when said insertion member is in said second position thereof, said insertion member having means extending outwardly between the leg portions of the phase insulation element in said second position of said insertion member for engaging the one end portion of the phase insulation element thereby to pull the element through the core member bore with the leg portions entering the two core member slots which communicate with the two spaces over the sides of previously inserted coils therein.

40. The apparatus of claim 39 further comprising a frame having a first section with said blade mounting means and first moving means means thereon, and a second section spaced from the distal ends of said blade elements with said insertion member and second moving means mounted thereon; a transfer member mounted on said frame for movement between a first position at a coil placing station and another position removed therefrom, said transfer member having means thereon for removably mounting the core member thereon, the bore of the core member in said first position of said transfer member being axially aligned with the array of blade elements, said phase insulation insertion member in said first position thereof being axially aligned with the core member bore in said first position of said transfer member and being on the side thereof remote from the distal ends of said blade elements.

41. The apparatus of claim 40 wherein said transfer member in said first position thereof is further movable between an inactive position with the core member axially spaced from the distal ends of the blade elements and a coil insertion position with the array of blade elements extending through the core member bore, said array having a first longitudinal axis, said transfer member being rotatable about a second axis spaced from and parallel with said first axis thereby to move said transfer member between said first and other positions thereof, said means for removably mounting said core member being coaxial with said first axis in said first position of said transfer member.

42. The apparatus of claim 41 wherein said phase insulation insertion member includes a gauge member on the side thereof toward the second moving means and movable with said insertion member, said gauge member having means thereon for gauging the alignment of the core member slots and the size and concentricity of the core member bore upon movement of said insertion member from said first to said second position thereof.

43. The apparatus of claim 42 wherein said gauge member has said cavity formed therein.

44. The apparatus of claim 39 wherein the slots of the core member have liners formed of insulative material respectively therein, each liner having cuff portions respectively extending on opposite sides of the core, and wherein said means for removably mounting said core member comprises a pair of cuff support assemblies for supporting the core member therebetween, each said cuff support assembly comprising a plurality of elongated finger elements having inner ends for engaging said cuffs and being movable radially between inner, cuff-engaging positions and outer, inactive positions.

45. The apparatus of claim 40 wherein said transfer member is movable from a loading and unloading position at a loading and unloading station to said first position and further comprising means at said loading and unloading station for moving an unwound stator core member into said means for removably mounting said core member and for removing a wound stator therefrom, and means at said loading and unloading station for inverting a wound stator core member after its removal from said core member mounting means.

46. The apparatus of claim 40 wherein said transfer member is movable from a loading and unloading position to a loading and unloading station to said first position, and further comprising an arbor member for receiving the bore of an unwound stator core member thereon, said arbor member having fin elements thereon movable from a retracted position to an extended position for extending respectively into the slots of the core member thereon, and means for moving said arbor member with a core member thereon into said means for removably mounting said core member.

47. The apparatus of claim 40 wherein said transfer member is movable from said first position to a second, end turn-forming position at an end turn-forming station, and further comprising a coil centering member and an end turn forming member mounted on a support on one of said frame sections, said support being movable between centering and forming positions, the bore of a wound core member in said second position of said transfer member being in axial alignment with said centering member in said centering position of said support and in axial alignment with said forming member in said forming position of said support, said forming member including first means for forming the end turns at one end of a wound stator core member radially outwardly away from the bore thereof, third means for moving said centering member in said centering position of said support relative to said transfer member in said second position thereof from an inactive position to an active position in the bore of the wound stator core member thereby to force the coil sides into the slots of the core member, and for moving said end turn forming member in said forming position of said support relative to said transfer member in said second position thereof from an inactive position to an active position with said first means for forming the end turns engaging the end turns at one end of the wound stator core member, the other of said frame sections having second means thereon for forming the end turns at the other end of a wound stator core member radially outwardly away from the bore thereof in said second position of said transfer member.

48. The apparatus of claim 47 wherein said transfer member is movable from said second position to a third, coil drifting position at a drift station, and further comprising a coil drifting member on one of said frame sections axially aligned with the bore of a wound stator core member in said third position of said transfer member, fourth means for moving said drifting member relative to said transfer member in said third position thereof from an inactive position to a drifting position in the bore of a core member, said drifting member having a plurality of drift fins thereof movable radially between a retracted position and an extended position for entering the slots of the core member and to drift the coils radially outwardly therein, and third means on the other frame section cooperating with said drifting member for forming the end turns at the respective end of a wound stator core member radially outwardly away from the bore in said third position of said transfer member.

49. The apparatus of claim 47 wherein said fourth moving means comprises means for moving said transfer member in said third position thereof between an inactive position spaced from said drifting member and a drifting position, and means for moving said drifting member between said positions thereof, and further comprising fifth means for moving said third means for forming the end turns from an inactive position to a forming position cooperating with said drifting member in the drifting position thereof with said transfer member in its drifting position.

* * * * *

UNITED STATES PATENT AND TRADEMARK OFFICE
CERTIFICATE OF CORRECTION

PATENT NO. : 4,455,743
DATED : June 26, 1984
INVENTOR(S) : Keith A. Witwer, et al.

It is certified that error appears in the above-identified patent and that said Letters Patent is hereby corrected as shown below:

Col. 5, line 17, change "actuation" to --actuator--.
Col. 6, line 48, change "9b" to --9B--.
Col. 7, line 9, after "180" second occurrence, insert --,--.
Col. 11, line 22, change "which" to --with--.
Col. 12, line 46, change"in" to --to--.
Col. 13, line 48, change "retaining" to --remaining--.
Col. 13, line 66, change "member" second occurrence, to --members--.
Cl. 39, Col. 24, line 21, change "respectivey" to --respectively--.
Cl. 40, Col. 24, line 67, delete "means" second occurrence and substitute therein --mounted--.

Signed and Sealed this

Ninth Day of July 1985

[SEAL]

Attest:

DONALD J. QUIGG

Attesting Officer    Acting Commissioner of Patents and Trademarks